(12) United States Patent
Barbieri et al.

(10) Patent No.: US 10,581,517 B2
(45) Date of Patent: Mar. 3, 2020

(54) VIRTUALIZATION AND ORCHESTRATION OF A RADIO ACCESS NETWORK

(71) Applicant: Phluido, Inc., San Diego, CA (US)

(72) Inventors: Alan Barbieri, La Jolla, CA (US); Dario Fertonani, La Jolla, CA (US)

(*) Notice: Subject to any disclaimer, the term of this patent is extended or adjusted under 35 U.S.C. 154(b) by 22 days.

(21) Appl. No.: 15/765,254

(22) PCT Filed: Oct. 23, 2016

(86) PCT No.: PCT/US2016/058351
§ 371 (c)(1),
(2) Date: Apr. 4, 2018

(87) PCT Pub. No.: WO2017/070635
PCT Pub. Date: Apr. 27, 2017

(65) Prior Publication Data
US 2018/0287696 A1     Oct. 4, 2018

Related U.S. Application Data

(60) Provisional application No. 62/297,111, filed on Feb. 18, 2016, provisional application No. 62/245,113, filed on Oct. 22, 2015.

(51) Int. Cl.
*H04W 4/00*     (2018.01)
*H04B 7/26*     (2006.01)
(Continued)

(52) U.S. Cl.
CPC ....... *H04B 7/2606* (2013.01); *G06F 9/45558* (2013.01); *H04B 7/15507* (2013.01);
(Continued)

(58) Field of Classification Search
CPC ......... H04W 56/0015; H04W 88/0085; H04W 28/0289; H04W 36/22; H04W 36/08;
(Continued)

(56) References Cited

U.S. PATENT DOCUMENTS 6,745,012 B1   6/2004  Ton
8,682,338 B2   3/2014  Lemson et al.
(Continued)

FOREIGN PATENT DOCUMENTS

EP    3051861 A1    8/2016
EP    2632072 B1   11/2016
(Continued)

OTHER PUBLICATIONS

USPTO, Non-Final Office Action for related U.S. Appl. No. 15/701,315, dated Mar. 19, 2019.
(Continued)

*Primary Examiner* — Hanh N Nguyen
(74) *Attorney, Agent, or Firm* — Young's Patent Services; Bruce A Young

(57) ABSTRACT

A distributed radio frequency communication system facilitates communication between wireless terminals and a core network. The system includes a group of remote radio units (RRUs). Each RRU of the group of RRUs is coupled to an antenna to communicate with at least some of the mobile terminals and includes electronic circuitry to perform at least a first portion of a first-level protocol of a radio access network (RAN) and communicate over a fronthaul link. The system also includes a baseband unit (BBU) coupled to the core network and the fronthaul link, and communicably coupled to the group of RRUs over the fronthaul link. The BBU includes electronic circuitry to assign one or more RRUs, selected from the group of RRUs, to a cluster of RRUs based on one or more parameters, and to perform at least a second-level protocol of the RAN.

32 Claims, 9 Drawing Sheets

(51) Int. Cl.
*H04B 7/155* (2006.01)
*G06F 9/455* (2018.01)
*H04W 28/02* (2009.01)
*H04W 36/08* (2009.01)
*H04W 36/22* (2009.01)
*H04W 88/08* (2009.01)

(52) U.S. Cl.
CPC ....... *H04W 28/0289* (2013.01); *H04W 36/08* (2013.01); *H04W 36/22* (2013.01); *H04W 88/085* (2013.01); *G06F 2009/45595* (2013.01)

(58) Field of Classification Search
CPC ... H04W 36/083; H04W 36/06; H04W 36/30; H04B 7/2606; H04B 7/15527; H04L 25/02; H04L 29/06; H04L 27/06
See application file for complete search history.

(56) References Cited

U.S. PATENT DOCUMENTS

| | | | |
|---|---|---|---|
| 8,964,641 B2 | 2/2015 | Dalela et al. | |
| 9,359,074 B2* | 6/2016 | Ganesh | G08G 5/0069 |
| 9,392,635 B2* | 7/2016 | Hahn | H04W 48/14 |
| 9,769,766 B2 | 9/2017 | Hejazi et al. | |
| 9,820,171 B2 | 11/2017 | Lemson et al. | |
| 9,847,816 B2 | 12/2017 | Zhuang et al. | |
| 9,973,939 B2* | 5/2018 | Ross | B64C 39/024 |
| 9,998,310 B2* | 6/2018 | Barbieri | H04L 29/06 |
| 10,045,314 B2 | 8/2018 | Stapleton et al. | |
| 10,080,178 B2 | 9/2018 | Stapleton et al. | |
| 10,097,391 B2 | 10/2018 | Fertonani et al. | |
| 10,159,074 B2 | 12/2018 | Lemson et al. | |
| 10,334,499 B2 | 6/2019 | Stapleton et al. | |
| 10,341,880 B2* | 7/2019 | Lange | H04B 7/2606 |
| 10,355,895 B2* | 7/2019 | Barbieri | H04L 27/26 |
| 10,383,024 B2 | 8/2019 | Imana | |
| 2012/0157089 A1 | 6/2012 | Yang et al. | |
| 2012/0163299 A1 | 6/2012 | Chen et al. | |
| 2012/0207206 A1 | 8/2012 | Samardzija et al. | |
| 2012/0250740 A1 | 10/2012 | Ling | |
| 2012/0300710 A1 | 11/2012 | Li et al. | |
| 2013/0100907 A1 | 4/2013 | Liu | |
| 2013/0322273 A1 | 12/2013 | Etemad et al. | |
| 2013/0329633 A1 | 12/2013 | Dalela et al. | |
| 2014/0029431 A1 | 1/2014 | Haberland et al. | |
| 2014/0031049 A1 | 1/2014 | Sundaresan et al. | |
| 2014/0171063 A1 | 6/2014 | Mori | |
| 2014/0185601 A1 | 7/2014 | Ilyadis | |
| 2014/0201383 A1 | 7/2014 | Kuehnel et al. | |
| 2014/0213249 A1 | 7/2014 | Kang et al. | |
| 2014/0226481 A1 | 8/2014 | Dahod et al. | |
| 2014/0226736 A1 | 8/2014 | Niu et al. | |
| 2014/0241315 A1 | 8/2014 | Niu et al. | |
| 2014/0255034 A1 | 9/2014 | Huo | |
| 2014/0286165 A1 | 9/2014 | Chowdhury et al. | |
| 2014/0286239 A1 | 9/2014 | Chowdhury et al. | |
| 2014/0286258 A1 | 9/2014 | Chowdhury et al. | |
| 2014/0293784 A1 | 10/2014 | Haberland | |
| 2014/0301288 A1 | 10/2014 | Koc et al. | |
| 2014/0303814 A1 | 10/2014 | Burema et al. | |
| 2014/0349667 A1 | 11/2014 | Hahn et al. | |
| 2014/0362801 A1 | 12/2014 | Morita | |
| 2014/0378047 A1 | 12/2014 | Kennard | |
| 2015/0189692 A1 | 7/2015 | Portolan et al. | |
| 2015/0215044 A1 | 7/2015 | Cvijetic et al. | |
| 2015/0230287 A1 | 8/2015 | Moon et al. | |
| 2015/0341941 A1 | 11/2015 | Nguyen | |
| 2015/0365934 A1 | 12/2015 | Liu et al. | |
| 2015/0372728 A1 | 12/2015 | Rahman et al. | |
| 2016/0026996 A1 | 1/2016 | Jain | |
| 2016/0080027 A1 | 3/2016 | Agata et al. | |
| 2016/0128085 A1 | 5/2016 | Liu et al. | |
| 2016/0143016 A1 | 5/2016 | Chanclou et al. | |
| 2016/0165521 A1 | 6/2016 | Choi et al. | |
| 2016/0183248 A1 | 6/2016 | Niu et al. | |
| 2016/0192181 A1 | 6/2016 | Choi et al. | |
| 2016/0212747 A1 | 7/2016 | Effenberger et al. | |
| 2016/0255613 A1 | 9/2016 | Faerber et al. | |
| 2016/0269961 A1 | 9/2016 | Imana | |
| 2016/0270006 A1 | 9/2016 | Choi et al. | |
| 2017/0238361 A1 | 8/2017 | Pawar et al. | |
| 2017/0250927 A1 | 8/2017 | Stapleton et al. | |
| 2017/0288695 A1 | 10/2017 | Feng et al. | |
| 2017/0373890 A1* | 12/2017 | Fertonani | H04L 25/02 |
| 2018/0000736 A1 | 1/2018 | Martin et al. | |
| 2018/0007736 A1 | 1/2018 | Ruttik et al. | |
| 2018/0013581 A1 | 1/2018 | Fertonani et al. | |
| 2018/0013597 A1 | 1/2018 | Barbieri et al. | |
| 2018/0034669 A1 | 2/2018 | Barbieri et al. | |
| 2018/0234875 A1 | 8/2018 | Leroudier | |
| 2018/0287696 A1 | 10/2018 | Barbieri et al. | |
| 2019/0007246 A1 | 1/2019 | Fertonani et al. | |

FOREIGN PATENT DOCUMENTS

| | | |
|---|---|---|
| WO | 2014018864 A1 | 1/2014 |
| WO | 2014076004 A3 | 7/2014 |
| WO | 2014110730 A1 | 7/2014 |
| WO | 2015037857 A1 | 3/2015 |
| WO | 2015060562 A1 | 4/2015 |
| WO | 2016145371 A2 | 9/2016 |

OTHER PUBLICATIONS

USPTO, Notice of Allowance for related U.S. Appl. No. 15/549,381 dated May 8, 2019.
Young, Bruce, Response/Amendment to Non-Final Office Action for related U.S. Appl. No. 15/701,315, dated Mar. 21, 2019.
European Patent Office, Supplemental Search Report for related application EP 1676243.1, dated Aug. 16, 2018.
Fertonani and Barbieri, Baseband Unit with Adaptive Fronthaul Link and Dynamic RAN Parameters, Unpublished U.S. Appl. No. 16/122,687, filed Sep. 5, 2018.
Nui et al., RAN architecture options and performance for 5G network evolution, 2014 IEEE Wireless Communications and Networking Conference Workshops (WCNCW) IEEE, Apr. 6, 2014, pp. 294-298.
USPTO, Non-final Office Action for related U.S. Appl. No. 15/701,362, dated Jun. 28, 2018.
Uwe et al., Quantitative Analysis of Split Base Station Processing and Determination of Advantageous Architectures for LTE, Bell Labs Technical Journal, vol. 18, No. 1, May 30, 2013, pp. 105-128.
Young, Bruce, Response Non-final Office Action for related U.S. Appl. No. 15/549,381 dated Mar. 6, 2019.
Young, Bruce, Response Non-final Office Action for related U.S. Appl. No. 15/701,362, dated Jun. 30, 2018.
USPTO, Notice of Allowance for related U.S. Appl. No. 15/701,362, dated Aug. 29, 2018.
Aleksandra Checko et al., 'Cloud RAN for Mobile Networks—A Technology Overview', IEEE Communications Surveys & Tutorials, pp. 1-24, Jan. 2015.
Choi, et al., Full-Duplex Wireless Design, Jul. 14, 2014, retrieved from http://sing.stanford.edu/fullduplex/ on Jul. 9, 2017.
Common Public Radio Interface (CPRI); Interface Specification, V7.0, Oct. 9, 2015, retrieved from http://www.cpri.info/downloads/CPRI_v_7_0_2015-10-09.pdf on Feb. 25, 2015.
Common Public Radio Interface, Mar. 11, 2015, retrieved from http://www.ieee802.org/1/files/public/docs2015/liaison-CPRI_Tdoc_1124_presentation-0315.pdf on Feb. 25, 2015.
Haijun Zhang et al., 'Cooperative Interference Mitigation and Handover Management for Heterogeneous Cloud Small Cell Networks', In: IEEE Wireless Communications, Jul. 6, 2015, vol. 22, Issue 3, pp. 92-99.
J. J. van de Beek, M. Sandell and P. O. Borjesson, ML estimation of time and frequency offset in OFDM systems, IEEE Transactions on Signal Processing, vol. 45, No. 7, pp. 1800-1805, Jul. 1997.
Korean Intellectual Property Office, International Search Report for PCT/US2016/022114, dated Nov. 17, 2016.

(56) References Cited

OTHER PUBLICATIONS

Korean Intellectual Property Office, International Search Report for PCT/US2016/058351, dated Apr. 11, 2017.

Korean Intellectual Property Office, Written Opinion of the International Searching Authority for PCT/US2016/022114, dated Nov. 17, 2016.

Korean Intellectual Property Office, Written Opinion of the International Searching Authority for PCT/US2016/058351, dated Apr. 11, 2017.

Liang Liu et al., 'Optimized Uplink Transmission in Multi-Antenna C-RAN With Spatial Compression and Forward', In: IEEE Transactions on Signal Processing, Jun. 25, 2015, vol. 63, Issue 19, pp. 5083-5095.

LTE; Evolved Universal Terrestrial Radio Access (E-UTRA) and Evolved Universal Terrestrial Radio Access Network (E-UTRAN); Overall description; Stage 2 (3GPP TS 36.300 version 12.4.0 Release 12), Feb. 2015, retrieved from http://www.etsi.org/deliver/etsi_ts/136300_136399/136300/12.04.00_60/ts_136300v120400p.pdf on Mar. 2, 2016.

LTE; Evolved Universal Terrestrial Radio Access (E-UTRA); Medium Access Control (MAC) protocol specification (3GPP TS 36.321 version 12.4.0 Release 12); Feb. 2015, retrieved from http://www.etsi.org/deliver/etsi_ts/136300_136399/136321/12.04.00_60/ts_136321v120400p.pdf on Mar. 2, 2016.

LTE; Evolved Universal Terrestrial Radio Access (E-UTRA); Physical channels and modulation (3GPP TS 36.211 version 12.4.0 Release 12), Feb. 2015, retrieved from http://www.etsi.org/deliver/etsi_ts/136200_136299/136211/12.04.00_60/ts_136211v120400p.pdf on Mar. 5, 2016.

LTE; Evolved Universal Terrestrial Radio Access (E-UTRA);LTE physical layer; General description (3GPP TS 36.201 version 12.1.0 Release 12), Feb. 2015, retrieved from http://www.etsi.org/deliver/etsi_ts/136200_136299/136201/12.01.00_60/ts_136201v120100p.pdf on May 16, 2016.

M. Morelli and U. Mengali, Carrier-frequency estimation for transmissions over selective channels,IEEE Transactions on Communications, vol. 48, No. 9, pp. 1580-1589, Sep. 2000.

Mayank Jain et al. in "Practical, Real-time, Full Duplex Wireless" published in the Proceedings of the 17th Annual International Conference on Mobile Computing and Networking (Mobicom 2011), Sep. 19, 2011.

Milosavljevic, Milos, Combined optical and wireless/wireline access based on existing requirements, Version 1.0, Sep. 30, 2011, retrieved from http://cordis.europa.eu/docs/projects/cnect/4/248654/080/deliverables/001-AccordanceD53WP5201130SeptemberUHv10.pdf on Feb. 10, 2016.

NGMN Alliance, 'Further Study on Critical C-RAN Technologies', version 1.0, Mar. 31, 2015.

USPTO, Final Office Action for related U.S. Appl. No. 15/701,290, dated Mar. 15, 2017.

USPTO, Non-Final Office Action for related U.S. Appl. No. 15/701,290, dated Nov. 14, 2017.

USPTO, Notice of Allowance for related U.S. Appl. No. 15/701,290, dated May 2, 2018.

Young, Bruce, Response/Amendment to Final Office Action for related U.S. Appl. No. 15/701,290, dated Mar. 22, 2018.

Young, Bruce, Response/Amendment to Non-Final Office Action for related U.S. Appl. No. 15/701,290, dated Feb. 12, 2018.

USPTO, Non-Final Office Action for related U.S. Appl. No. 15/701,315, dated Jul. 17, 2019.

European Patent Office, Examination Report for related case EP 16762643.1, dated Aug. 30, 2019.

USPTO, Final Office Action for related U.S. Appl. No. 15/701,315, dated Dec. 23, 2019.

USPTO, Non-Final Office Action for related U.S. Appl. No. 16/122,687, dated Jan. 23, 2020.

* cited by examiner

VIRTUALIZATION AND ORCHESTRATION OF A RADIO ACCESS NETWORK

CROSS-REFERENCE TO RELATED APPLICATIONS

The present application claims priority to U.S. Provisional Patent Application No. 62/245,113, entitled Methods for IP-based fronthaul in virtualized Radio Access Network, filed on Oct. 22, 2015, and to U.S. Provisional Patent Application No. 62/297,111, entitled Virtualization and Orchestration Methods for Radio-as-a-Service, filed on Feb. 18, 2016. The present application is also related to International Patent Application No. PCT/US2016/022114, entitled DISTRIBUTED RADIO ACCESS NETWORK WITH ADAPTIVE FRONTHAUL, filed on Mar. 11, 2016, which claims priority to U.S. Provisional Patent Application No. 62/131,337, entitled Methods for Radio-as-a-Service, filed on Mar. 11, 2015. The entire contents of all four aforementioned applications are hereby incorporated by reference herein for any and all purposes.

BACKGROUND

Technical Field

The present subject matter relates to wireless communications. More specifically, the present subject matter relates to a distributed radio access network (RAN).

Background Art

As cellphones have become nearly ubiquitous over the last few years, and smartphones have become the primary type of cellphone used in many countries, the data traffic generated by smartphones has increased dramatically. This increase in cellular data traffic has not been matched by a proportional increase of the available radio spectrum. Radio spectrum is a fixed resource, so making any additional frequency bands available for cellphones, or other mobile terminals, come at the expense of other uses. This makes it very difficult to accomplish; therefore, efficient use of the existing spectrum is very important. As such, management of the precious spectrum has become very complex. Hence, network deployment and maintenance are expensive, lengthy, and error-prone processes.

A Radio Access Network (RAN) provides access to a core network for a mobile terminal, such as a smartphone. RANs have progressed through several different generations of technology, and are sometimes referred to by a so-called "generation number," such as 3G, or 4G networks. An example 2G RAN is the GSM (Global System for Mobile Communications) Radio Access Network (GRAN), example 3G RANs include the GSM EDGE Radio Access Network (GERAN), and the Universal Mobile Telecommunications System (UMTS). An example 4G network is the Long-Term Evolution Advanced (LTE-A) which is also known as the Evolved Universal Terrestrial Radio Access Network (E-UTRAN) and may also be referred to simply as "LTE" herein. Each RAN communicates with mobile terminals using radio frequency communication protocols defined by the RAN at frequencies supported by the RAN and licensed by a particular communications company, or carrier. The frequencies are modulated using a variety of techniques, depending on the RAN, to carry digital information that can be used for voice transmission and/or data transfer.

Each RAN can define its own software structure, but many generally conform to the 7-layer Open Systems Interconnection (OSI) model. The seven layers include a lowest layer, layer 1, which is commonly referred to as the physical layer or PHY, which describes the transmission and reception of raw bit streams over a physical medium. The next layer, layer 2, is known as the data link layer, but often is referred to by the name of a protocol that resides at that layer, such as the medium access protocol (MAC), or point-to-point protocol (PPP), which provide for transmission of data frames between two nodes connected by a physical layer. The third layer, known as the network layer, manages a multi-node network and handles such issues as addressing, to send packets of data between nodes. The internet protocol (IP) is a commonly used network layer protocol. The next layer, layer 4, is known as the transport layer. Common transport protocols include the transmission control protocol (TCP) and the user datagram protocol (UDP). Transport protocols manage transmission of data segments between nodes of the network. Layer 5, the session layer, manages communication sessions, layer 6, the presentation layer, translates data between a networking service and an application, and the top layer, layer 7 or the application layer, provides high-level application programming interfaces (APIs) for network related services.

More details of an E-UTRAN are provided as an example. The specifications for E-UTRAN are developed and published by the $3^{rd}$ Generation Partnership Project (3GPP). The specifications related to E-UTRAN are known as the 36 series specifications and are available for download from the 3GPP website at http://www.3gpp.org/DynaReport/36-series.htm. Several of the specifications include information helpful in understanding this disclosure, including: "LTE; Evolved Universal Terrestrial Radio Access (E-UTRA); LTE physical layer; General description," 3GPP TS 36.201 version 12.1.0 Release 12, 2015-02; "LTE; Evolved Universal Terrestrial Radio Access (E-UTRA); Physical channels and modulation," 3GPP TS 36.211 version 12.4.0 Release 12, 2015-02; "LTE; Evolved Universal Terrestrial Radio Access (E-UTRA) and Evolved Universal Terrestrial Radio Access Network (E-UTRAN); Overall description; Stage 2," 3GPP TS 36.300 version 12.4.0 Release 12, 2015-02; and "LTE; Evolved Universal Terrestrial Radio Access (E-UTRA); Medium Access Control (MAC) protocol specification," 3GPP TS 36.321 version 12.4.0 Release 12, 2015-02; all four of which are incorporated by reference herein.

In an E-UTRAN, a base station is known as an enhanced node B (eNB) and a mobile terminal is known as user equipment (UE). An eNB can manage one or more cells, also called sectors, and is responsible for transmission and reception of wireless signals as well as interfacing with the core network, known as evolved packet core (EPC). It provides connectivity, that is, reliable data transfer (whenever possible), and control paths to the UEs in its coverage area. An eNB communicates with a UE using a pair of carrier frequencies, one for uplink (UL) and one for downlink (DL), if using Frequency Division Duplex (FDD), or using a single carrier frequency for both UL and DL if using Time Division Duplex (TDD). The DL uses Orthogonal Frequency Division Multiple Access (OFDMA) modulation of the carrier, and the UL uses Single-Carrier Frequency Division Multiple Access (SC-FDMA), which is also known as Linearly Precoded OFDMA (LP-OFDMA). While the two modulation schemes are different, they share many similar qualities, and term "OFDM" may generally be used herein to describe either scheme.

In a traditional implementation, eNBs are separate logical entities, connected to the same core network via the S1 interface, which can be conveyed over a wired or wireless backhaul connection. An optional X2 interface may be used to directly connect neighbor eNBs. During a call, a UE may be handed over to neighbor eNBs, depending on radio conditions and traffic load. Handovers imply, among other things, a transfer of "context" of the UE being handed over, from a source eNB to a destination eNB. Such transfer may occur via the S1 interface or via the X2 interface, if available. The functions of the eNB can be broadly classified as radio frequency (RF) functions that deal with radio frequency signals, and baseband (BB) operations that deal with digital data.

An eNB implements several functions which together can be classified baseband (BB) operations. The baseband operations include the physical-layer (PHY) functions, medium access control (MAC) layer functions, radio link control (RLC) layer functions, packet data converge protocol (PDCP) layer functions, and radio resource control (RRC) layer functions.

Physical-layer (PHY) functions include, among others, transmission of downlink physical channels, such as physical downlink control channel (PDCCH), physical downlink shared channel (PDSCH), and cell-specific reference signal (CRS). The PHY layer functions also include reception of uplink physical layer channels, such as physical uplink shared channel (PUSCH), physical uplink control channel (PUCCH), physical random access channel (PRACH) and sounding reference signal (SRS). The PHY layer also handles synchronization, measurements of radio conditions, and other miscellaneous functions.

Medium access control (MAC) layer functions include scheduling, mapping of transport channels to logical channels, maintenance of uplink time alignment, hybrid automatic repeat request (HARD) operation, and discontinuous reception (DRX). Radio link control (RLC) layer functions include concatenation, segmentation, reassembly, reordering, and error correction (through ARQ). Packet data convergence protocol (PDCP) layer functions include in-sequence delivery of data units, header compression, elimination of duplicates, ciphering and deciphering, and integrity protection and verification. Radio resource control (RRC) layer functions include broadcast of system information, connection control, mobility, and measurement configuration and control.

In a traditional implementation, all eNB functions are carried out by specialized hardware devices, dedicated telecommunications equipment, data centers, and the like. In such traditional systems, the entire eNB is located in one location, allowing the eNB to be managed as a single unit. In another implementation, one or more eNBs are managed by the same hardware device or co-located devices and the transmission and reception antennas corresponding to the eNBs are distributed in a potentially large region. In such implementation, group of co-located antennas may be denoted as remote radio heads (RRHs), and a special interface connects the processing device with the RRHs it manages. A RRH can also be referred to as a remote radio unit (RRU) and the terms are used interchangeably herein.

In one implementation, which may be referred to as a distributed RAN or a Cloud-RAN, a RRH is targeted to have a smaller form factor, reduced power consumption, and lower operating expenses. To meet this goal, the RRH implements a minimum set of functions. In such implementations, the RRH may only include radio frequency (RF) functions such as amplification, filtering, up and down frequency conversion, digital to analog and analog to digital conversions, and the like, and baseband processing is still performed by dedicated equipment, which may not be co-located with the RRH.

A block diagram of a traditional distributed RAN 100 is shown in FIG. 1. The RAN 100 includes a central office 102 with one or more baseband units (BBUs) 160 that include all of the functionality for the PHY layer and the MAC layer of the RAN protocol. The RAN 100 also includes multiple RRUs 130 that include RF functionality and are each coupled to one or more antennas 131 to communicate with UE devices, such as smartphones. The interface between a BBU 160 and a RRH 130, is referred to as a fronthaul link 145. A traditional fronthaul link 145, can utilize a wired, optical, or radio frequency physical link, but the traditional fronthaul link is synchronous, low-jitter, and usually point-to-point. The fronthaul link 145 may be referred to as being "fiber-grade" indicating that it is high speed and low latency with minimal jitter. In some cases, the fronthaul link 145 uses a proprietary protocol, but in many implementations, a standardized protocol, such as the Common Public Radio Interface (CPRI) or the Open Base Station Architecture Initiative (OBSAI), is used. A central office 102 may host multiple BBUs 160, which in turn may control multiple RRUs 130. The BBUs 160 of the central office 102 are coupled to the core network, or EPC 199, by a backhaul link 190, that may utilize standard networking technology and is much more tolerant of latency and jitter issues than the fronthaul link 145.

One key issue with a distributed RAN 100 architecture is latency. Different functions in the baseband stack can have different requirements of end-to-end latency. As an example, HARQ, implemented in the MAC layer, requires an end-to-end delay of less than 4 ms in an LTE FDD (frequency division duplex) implementation. This means that from the time a UE transmits a data packet via the PUSCH channel, there is a maximum time, set by the specification, for the eNB to provide a corresponding HARQ response, such as a non-acknowledgement (NACK) to the UE. The overall latency for performing a specific function of the baseband stack (e.g. downlink HARQ processing) includes the time spent by the UE to perform the function, the bidirectional propagation delay over the wireless medium, and any propagation and processing delay over the fronthaul link 145 that connects the antennas to the BBU 160.

If the overall latency for performing a specific function does not satisfy specific constraints imposed by the standard for the function, the system may fail, and communication between an eNB and a UE cannot be sustained. Thus, latency constraints need to be satisfied in all operating conditions. This requires hard, real-time, constraints on the processing of specific latency-constrained functions, or functions that have an impact on the overall system timeline. Furthermore, fronthaul propagation delays from the antennas 131 to the BBUs 160 also must be accounted for within the overall latency constraint. In order to minimize the additional latency introduced by exchange of data between the BBUs 160 and the RRUs 130, a fiber-grade fronthaul is traditionally used.

BRIEF DESCRIPTION OF THE DRAWINGS

The accompanying drawings, which are incorporated in and constitute part of the specification, illustrate various embodiments. Together with the general description, the drawings serve to explain various principles. In the drawings.

DETAILED DESCRIPTION

Figure 1:
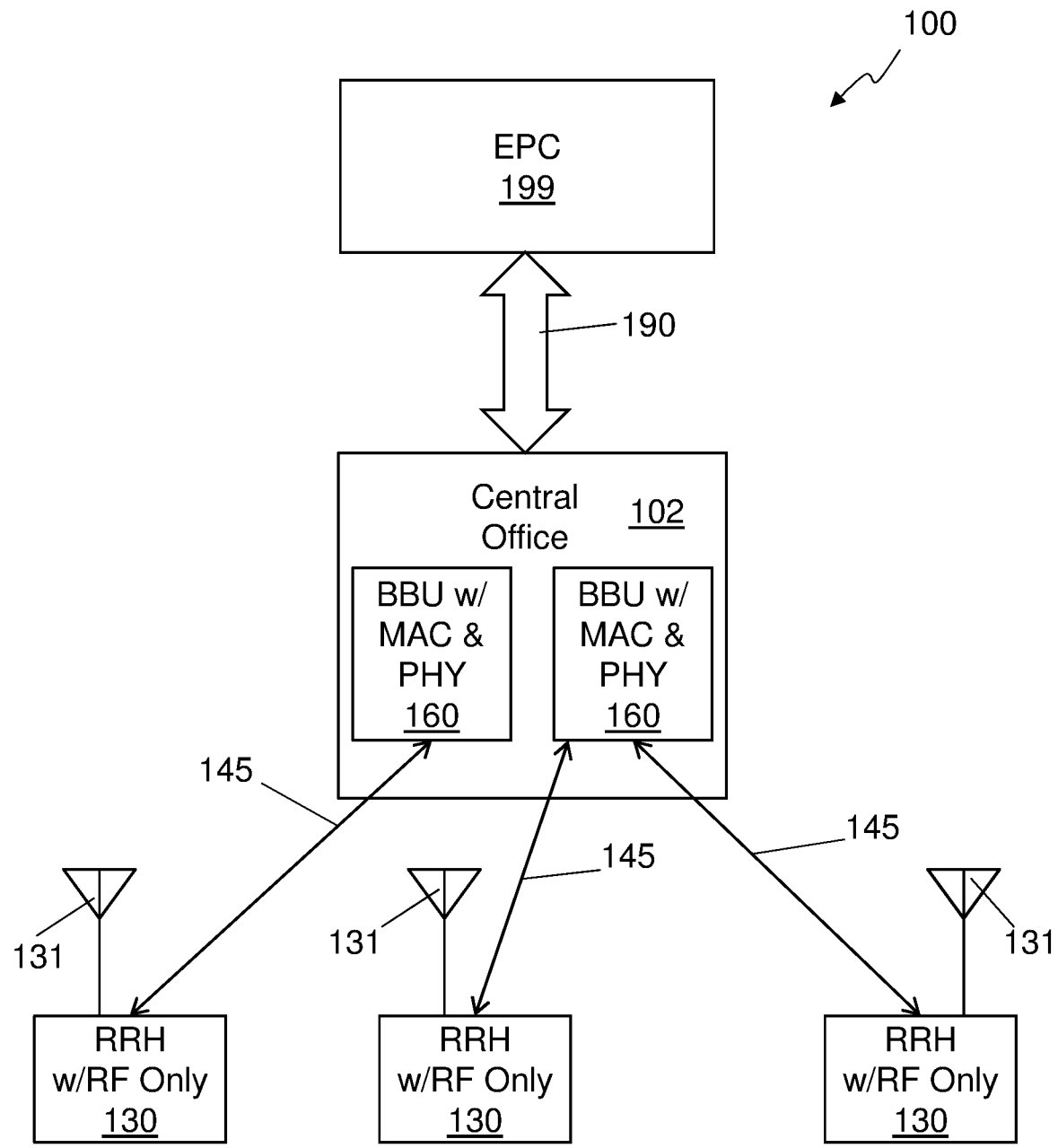
FIG. 1 is a block diagram of a traditional distributed radio access network (RAN)

In the following detailed description, numerous specific details are set forth by way of examples in order to provide a thorough understanding of the relevant teachings. However, it should be apparent to those skilled in the art that the present teachings may be practiced without such details. In other instances, well known methods, procedures and components have been described at a relatively high-level, without detail, in order to avoid unnecessarily obscuring aspects of the present concepts. A number of descriptive terms and phrases are used in describing the various embodiments of this disclosure. These descriptive terms and phrases are used to convey a generally agreed upon meaning to those skilled in the art unless a different definition is given in this specification. Some descriptive terms and phrases are presented in the following paragraphs for clarity.

A Baseband Unit (BBU) is a portion of a base station of a radio access network (RAN) that implements most, or all, of the OSI layer 2 functionality of the RAN and may include functionality of higher OSI network layers. The BBU may also be referred to as a virtual radio access network (vRAN) and the terms may be used interchangeably. In some embodiments, the BBU may include portions of the OSI layer 1 functionality of the RAN and a data connection to a remote radio unit (RRU).

A Remote Radio Unit (RRU), which can also be referred to as a remote radio head (RRH), is a portion of a base station of a RAN that includes a connection to couple to an antenna and transmitter and/or receiver circuitry, but does not include full OSI layer 2 functionality of the RAN, such as medium access control (MAC) functionality. A RRU also includes some or all of the OSI layer 1 functionality of the RAN and a data connection to a baseband unit (BBU).

A Fronthaul Link, or fronthaul connection, is the data connection used by a BBU and RRU to communicate with each other. Any sort of data communication mechanism can be used, depending on the embodiment, but in at least some embodiments, a network is used that is compatible with a standard published or maintained by The Institute of Electrical and Electronic Engineers (IEEE®) 802® working groups, such as a version of the IEEE 802.3 standard (i.e. Ethernet), a version of the IEEE 802.11 standard (i.e. WiFi®), or a version of IEEE 802.16 (i.e. WiMAX®). If a network having a non-deterministic protocol is used, an adaptive link protocol can be used by the BBU and RRU for communication over that link. In other embodiments, the fronthaul link may be a dedicated fiber-grade link using common public radio interface (CPRI) or other deterministic protocol.

A Cluster of RRUs is a set of RRUs that are managed by a single BBU at a given point in time. The RRUs of a given cluster may be selected from a group of RRUs that the BBU can communicate with. A reference to "the group/cluster of RRUs" can mean one or more RRUs that are included in the group/cluster of RRUs and does not necessarily mean that every one of the RRUs in the group/cluster of RRUs are being referred to by each reference. A reference to the group/cluster can refer to a single RRU of that group/cluster, two RRUs of that group/cluster, or any combination of the RRUs of that group/cluster, up to and including all of the RRUs of that group/cluster.

User Equipment (UE) refers to a device in wireless communication with the base station of the RAN. It may also be referred to as a mobile terminal, mobile device, wireless terminal, or a wireless device and the terms may be used interchangeably, even though some UE may not be mobile or may not be completely wireless (e.g. may have a wired power connection). Examples of UE include smart-phones, tablets, mobile WiFi hotspots, remote data collection units (e.g. weather stations), and connected automobiles.

An unmanned aircraft system (UAS) can also be known as a drone, an unmanned aerial vehicle (UAV), or an unmanned aircraft, and the terms may be used interchangeably herein. A UAS can be remotely piloted or can be autonomously piloted based on parameters provided to the UAS, such as a predetermined flight path, a hover position including latitude, longitude, and altitude, a position relative to a fixed or moving ground-based target, or other parameters.

A virtual machine (VM), as the term is commonly used in the industry, is an emulation of a computer system that runs on a physical computer host, such as a server. A VM looks and acts like it is a stand-alone computer to the computer programs that run within the VM, with its own operating system (OS) and memory and I/O resources available to the program to use. A single host computer may have any number of VMs running on it and a single VM can then have one or more programs that run on it. As an example, a BBU can be embodied as a program running within a VM on a server. As used herein, however, the term virtual machine (VM) can also include an operating system environment natively running on the computer hardware, which may be a different use of the term than one of ordinary skill in the art would typically use. The term may be used in some instances, however, where it will be clear to one of ordinary skill that an OS running natively on the computer hardware would not be included in that particular instance.

Turning now to a description of the technology disclosed herein, a distributed radio access network (RAN) uses one or more baseband units (BBUs) coupled to one or more remote radio units (RRUs) over a fronthaul link. This system may be referred to as using Radio-as-a-Service™ (RaaS) technology or a RaaS system. The BBUs can be based on proprietary hardware or can be implemented using software on a computer server, although dedicated hardware acceleration added to the server may be used in some embodiments. The RRUs are typically built using custom hardware and include, or are coupled to, a radio frequency (RF) receiver, transmitter, or transceiver.

RaaS technology enables easy deployment and maintenance of RAN systems, including 4G networks, and clears the path to 5G networks. RRUs are simple and relatively inexpensive plug-and-play devices that allow RAN connectivity to be positioned wherever it is needed, and BBUs can be instantiated on commodity servers to implement the RAN software stack without any dedicated hardware in many cases. With such a virtual implementation of the radio stack, network updates and upgrades can be handled as software patches using well-established techniques for updating software. Thus, a RaaS architecture makes it straightforward to adopt advanced features such as LTE-U (LTE in unlicensed spectrum) or even 5G.

A BBU may run in the cloud, along with an orchestration layer, using an adaptive fronthaul protocol over a standard IP-based network to communicate with one or more RRUs. The adaptive fronthaul protocol may be referred to as RaaS Fronthaul over IP (RaaS-FIP). RaaS-FIP may be used for the exchange of datagrams between a BBU and a RRU. Many different RAN architectures can be supported by a RaaS architecture including, but not limited to, LTE and LTE-A. The BBU implements at least some portion of the networking stack of the RAN, including layer 2 and in some cases portions of layer 1. Higher level layers, may also be included in some embodiments of the BBU.

RaaS can virtualize the RAN stack by replacing dedicated, expensive, and bulky base stations with software running on general purpose x86 or ARM CPUs communicating with small, easily deployed RRUs. BBUs can be deployed in many different ways. In some cases a BBU can be a dedicated hardware unit, which may be based on commodity hardware, or as software installed on a standard computer, such as a rack-mounted server. A BBU may be positioned in traditional central office type installations. In such situations, an IP-based fronthaul link using RaaS-FIP may be used for communication between the BBU and RRU, but in some cases a non-IP-based fronthaul link, such as a fiber-grade communications link with a deterministic protocol like CPRI, may be used with dedicated hardware for the communications link included in the dedicated BBU hardware unit. In some cases, BBUs may be mobile, such as using BBUs instantiated on racks of commodity server mounted in a truck. But in many cases, BBUs are instantiated on servers based in data centers, and a standard IP-based network used for communications with the RRUs. The data centers and servers may be owned by the carrier, or they may be owned by a third party that leases the computers to the carrier. In some cases, BBUs can be instantiated using a public computing cloud service such as those offered by Google Compute Engine™ (GCE) compute services or Amazon Web Services™ (AWS) compute services.

Positioning RRUs where they are needed allows a carrier to respond to changing customer demands. In a traditional RAN architecture, significant planning and manual configuration needs to take place to deploy a new set of base stations which are bulky and expensive. In a RaaS system, RRUs can be easily positioned where they are need and BBUs dynamically instantiated in a remote data center to support the RRUs as they are positioned. In fact, the RRUs can even be mobile, located on ground-based or aerial vehicles, and the RaaS system can dynamically respond to, or even control, the movement of the mobile RRUs to meet the ever-changing requirements of the mobile terminals in use. BBUs can also be mobile and dynamically associated with RRUs automatically. This can be useful in situations where mobile device usage may peak, such as at concerts and sporting events, events occurring in areas will little to no permanent RAN coverage, and emergency situations, such as responding to a natural disaster, where much of the existing infrastructure may be non-operational. The RaaS system provides the benefits of virtualization, including resource pooling and dynamic allocation of resources when and where it is needed. In addition, all of this can be done with little to no advance planning due to the automatic dynamic allocation of the requested resources.

Embodiments of a RaaS architecture can employ an orchestration function. The orchestration function may be integrated into BBUs or may be instantiated separately from a BBU, depending on the embodiment. If there are multiple orchestration modules, such as if multiple BBUs have integrated orchestration modules, the various orchestration modules coordinate with each other. The orchestration module may be implemented as software running on a standard computer, such as a rack-mounted server, or may be implemented using at least some special-purpose hardware. In some embodiments, the orchestration module may be implemented as electronic circuitry, either dedicated or as circuitry employing a processor that executes instructions. The orchestration module can communicate with the BBUs and/or RRUs, depending on the embodiment, and can perform several functions for the RaaS system. In some embodiments, a centralized orchestration module takes care of coordinating existing and incoming RRUs, BBU instances, and virtual machines. In such embodiments, the centralized orchestration module may run in its own virtual machine, or it may share a virtual machine with a BBU. In some cases, especially in larger systems, there may be more than one centralized orchestration module, and the multiple centralized orchestration modules can coordinate among themselves to manage a portion of the RAN. In other embodiments, each BBU includes an orchestration function that manages RRUs for that BBU and coordinates with the orchestration function of other BBUs. In some embodiments, some BBUs may have an integrated orchestration function while other BBUs may not, and are supported by a centralized orchestration function. In such cases, the centralized orchestration function coordinates with the orchestration functions integrated into BBUs to manage the RaaS system.

RaaS virtualization decouples RRUs and corresponding controlling BBU instances. RRUs may have multiple controlling BBU instances over time, and BBU instances may control multiple RRUs. The mapping of a RRUs to a cluster of RRUs may be dynamically changed.

In some embodiments, a BBU may be instantiated to directly run on an operating system (OS) running natively on the server. In other cases a BBU may be instantiated in a virtual machine running on the server. In some embodiments, a virtual machine provisioned for a RaaS deployment in a data center continuously runs a BBU instance, which is associated with a cluster of RRUs that may include zero, one, or more RRUs. In some embodiments, a BBU instance may start automatically when a virtual machine instance is created. In other embodiments, BBU instances can be dynamically created and destroyed on the virtual machines. Multiple BBU instances may be running on a single virtual machine.

Virtual machines may be provisioned with different computational resource, storage space, network capabilities, interfaces, and the like, depending on the details of the particular BBU that will run on that virtual machine. BBU instances with different capabilities, such as a number of RRUs controlled, bandwidth provided to mobile terminals, and the like, may be instantiated on virtual machines according to the resources of the available virtual machines. Tools such as those from the OpenStack® project, the Open- Nebula™ project, OpenQRM, and the like, may be used for provisioning, management, and other tasks of the data center devoted to RaaS operations. Virtual machines may be instantiated, destroyed, migrated, and otherwise managed, according to data center capacity, provisioning, network deployment size and load, costs, and other factors. In some embodiments, each physical computer may host a single virtual machine, while in other embodiments, a single physical computer may host multiple virtual machines. A virtual machine may run one or more instances of a BBU, depending on the embodiment. In yet another embodiment, BBU instances may run in an OS running natively on a physical computer. But as the term is used herein, a BBU is running on a virtual machine in each of the examples above.

Reference now is made in detail to the examples illustrated in the accompanying drawings and discussed below.

Figure 2:
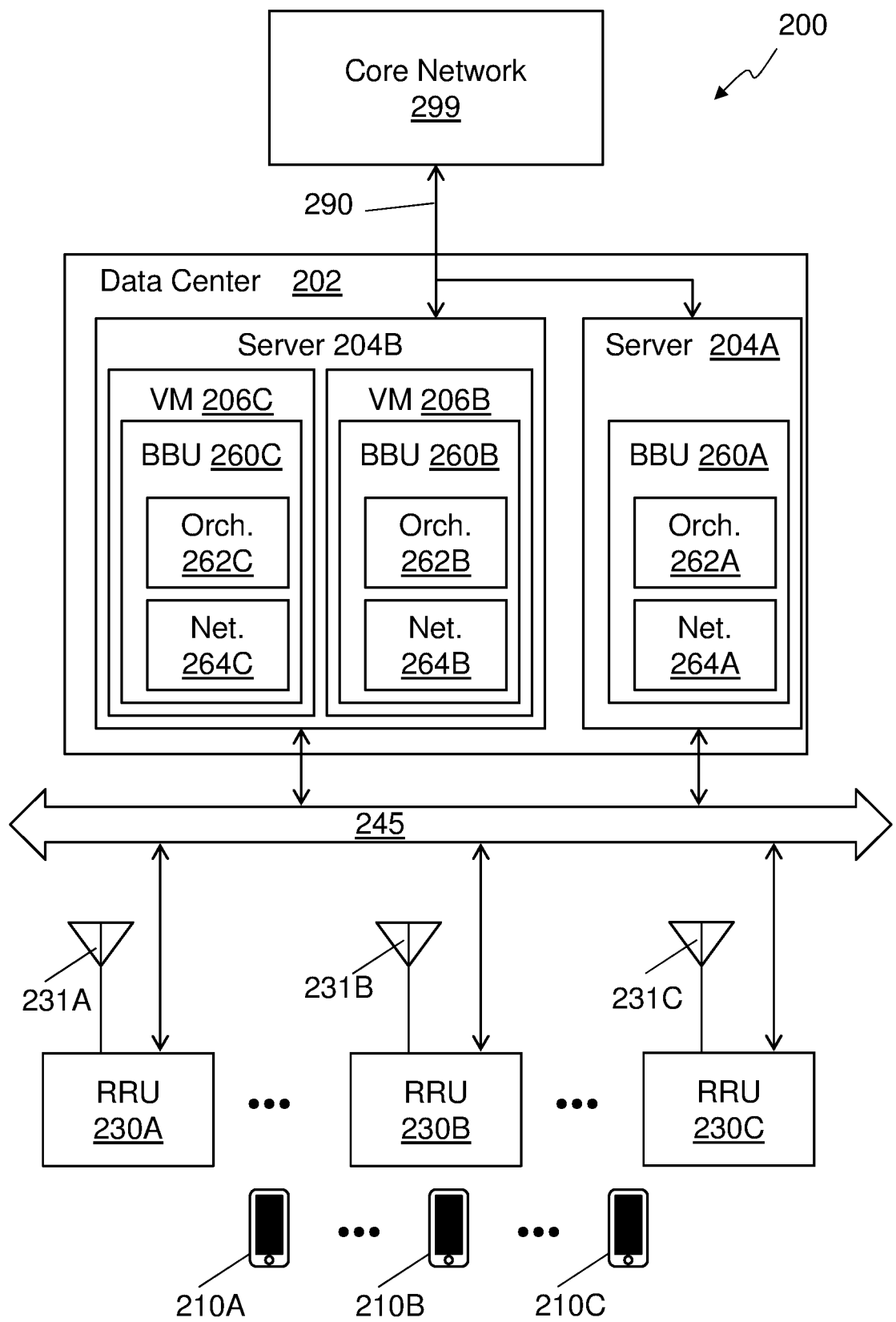
FIG. 2 is a block diagram of an embodiment of a distributed RAN.

FIG. 2 is a block diagram of an embodiment of a distributed radio access network (RAN) 200 using RaaS technology. The RAN 200 represents a radio frequency communication system to facilitate communication between a wireless terminal and a core network 299. The RAN 200 can be any type of RAN, but in at least some embodiments, the RAN 200 is an Evolved Universal Terrestrial Radio Access Network (E-UTRAN), and the core network 299 includes an Evolved Packet Core (EPC). While an E-UTRAN system is used as an example in this document, the principles, systems, apparatus, and methods disclosed herein can be applied by one of ordinary skill to different radio access networks, including legacy networks such as Universal Mobile Telecommunications System (UMTS), other contemporary networks such as Worldwide Interoperability for Microwave Access (WiMAX), and future networks.

The RAN 200 includes a first remote radio unit (RRU) 230A coupled to an antenna 231A to communicate with a wireless terminal 210A. Depending on the system, any number of RRUs can be included, such a second RRU 230B coupled to a second antenna 231B, and a third RRU 230C coupled to third antenna 231C. The multiple RRUs 230A-C can be geographically distributed and/or there can be multiple RRUs 230A-C in a single location. A single RRU 230A can be coupled to any number of antennas, although many installations couple two antennas to each RRU 230A-C. A RRU 230A includes electronic circuitry to perform at least a first portion of a first-level protocol of the RAN 200 for communicating between the wireless terminal 210A and the core network 299.

The RAN 200 also includes a first baseband unit (BBU) 260A coupled to the core network 299. The first BBU 260A may be implemented using software running on a computer server 204A. The server 204A may be one of multiple servers, including server 204B, situated in a data center 202 to provide power, cooling, network connectivity, and management, to the servers 204A-B. In some cases the data center 202 and its servers 204A-B may be owned by a carrier that operates the RAN 200, but in other cases, the data center 202 and its servers may be owned by a third party provider that leases specific equipment or resources, such as a virtual machine 206B, to the operator of the RAN 200.

The computer server 204A includes a processor to execute code that includes instructions of one or more modules of the BBU 260A. The server 204A also includes one or more memory devices, coupled to the processor, to store the code, and interface circuitry coupled between the processor and a fronthaul link 245.

The first BBU 260A is coupled to a core network 299 and is used in a distributed RAN 200 with a cluster of remote radio units (RRUs), including RRU 230A. The first BBU 260A includes an orchestration module 262A that includes instructions to run on a processor of the server 204A. The instructions of the orchestration module 262A assign one or more RRUs, including first RRU 230A, selected from a group of RRUs 230A-C communicably coupled to the fronthaul link 245, to the cluster of RRUs based on one or more parameters. The first BBU 260A also includes a networking module 264A that includes instructions to run on a processor of the server 204A. The instructions of the networking module 264A perform at least a second-level protocol of the RAN 200 and communicate over the fronthaul link 245 with the cluster of RRUs, including RRU 230A. In some embodiments, the instructions of the networking module 264A also perform a portion of a first-level protocol of the RAN 200 and/or communicate over the fronthaul link 245 with the cluster of RRUs using an adaptive fronthaul protocol. In at least some embodiments, the first-level protocol of the RAN 200 comprises an Evolved Universal Terrestrial Radio Access (E-UTRA) physical-layer (PHY) protocol, and the second-level protocol comprises an E-UTRA medium access control (MAC) protocol.

Depending on the system, any number of BBUs can be included, such as a second BBU 260B with a second orchestration module 262B and a second networking module 264B, and a third BBU 260C with a third orchestration module 262C and third networking module 264C. A BBU can run directly in an OS running natively on a server, such as the first BBU 260A running on the first server 204A, or a BBU can run in a virtual machine, such as the second BBU 260B running on virtual machine 206B, which is hosted by the second server 204B. The BBUs of the RAN 200 can be geographically distributed and/or there can be multiple BBUs in a single location, such as the BBUs 260B-C shown in the data center 202. The BBUs 260A-C are coupled to the core network 299 using a backhaul link 290. The backhaul link 290 can be any sort of communication link, such as a S1 interface in an E-UTRAN, or an internet protocol (IP) packet-based network, depending on the embodiment. The backhaul link 290 may include the internet or a dedicated IP/Multiprotocol Label Switching (MPLS) network in some embodiments. Furthermore, some of additional BBUs may be remotely located in the "cloud", that is, data and control transport channels may be established between a remote BBU and a RRU, and those channels may be routed over multiple different physical media, and may be processed by multiple intermediate network nodes, such as routers, switches, and the like.

The RAN 200 also includes a fronthaul link 245 coupled to the BBUs 260A-C and the group of RRUs 230A-C and utilizing an adaptive fronthaul protocol for communication between the BBUs 260A-C and the group of RRUs 230A-C. In some embodiments, the fronthaul link 245 includes a non-deterministic communication link, where at a latency, an arbitration, a bandwidth, a jitter, a packet order, a packet delivery, or some other characteristic of the communication link, cannot be determined with certainty in advance. In some embodiments, the fronthaul link 245 has a variable roundtrip latency with a maximum that is greater than a response time requirement for a message type sent by the wireless terminal and processed by the second-level protocol of the RAN 200. In at least one embodiment, the fronthaul link 245 exhibits jitter in excess of a maximum jitter requirement of the RAN 200, and in some embodiments, the fronthaul link 245 has a variable throughput with a minimum throughput less than a maximum throughput of the wireless terminal 210A. Many embodiments utilize a fronthaul link 245 that includes an Ethernet network. In some embodiments, the adaptive fronthaul protocol comprises a packet-based protocol with non-guaranteed in-order packet delivery and/or non-guaranteed packet delivery, and may utilize an internet protocol (IP).

The fronthaul link 245 may include multiple networks and/or communication links coupled together with active network devices, such as bridges, routers, switches, and the like. In some installations, the fronthaul link 245 may include a link, such as a synchronous optical networking (SONET) link, from one or more BBUs to a remote active network device, which then provides dedicated local links to one or more RRUs, such as 1000Base-T Ethernet links. In this configuration, the link from the active network device to the BBU is shared by multiple RRUs.

Additional network nodes required by the RAN 200 to operate properly, such as blocks belonging to the EPC network, the mobility management unit (MME), the home subscriber server (HSS), and the like, may also be remotely located and accessible via transport channels conveyed over the core network 299 or may be co-located on a server 204A-B in the data center 202.

The various fronthaul and backhaul connections at different levels may have different characteristics in terms of throughput, latency, reliability, quality of service, and the like. For example, a fronthaul connecting RRUs to nearby BBUs may be based on dedicated fiber-grade connections, whereas the fronthaul connecting BBUs to more distant RRUs may be conveyed over a shared medium using internet protocol (IP). The backhaul connecting the BBUs to the core network may be yet a different network connection.

Embodiments described herein may utilize an adaptive fronthaul protocol for communication between the RRU and the BBU. An adaptive fronthaul protocol provides mechanisms for the BBU and/or RRU to react to changes in the environment, such as the changes in the fronthaul, the radio signal, the loads of the mobile terminals coupled to the RRUs, or other characteristics of the system, to provide a graceful adaptation to the changes instead of losing the connection between the BBU and RRU if the new conditions cannot support the previous parameters of the connection. Thus, the adaptive fronthaul protocol has provisions for adapting to conditions of the fronthaul link and radio network by changing the way data is communicated over the fronthaul link. Characteristics of an adaptive fronthaul protocol may include, but are not limited to, adapting a compression of the fronthaul uplink information and/or fronthaul downlink information, adapting an amount of loss of data caused by the compression, changing a parameter of the RAN based on characteristics of the fronthaul link, bypassing a function of a second-layer protocol of the RAN based on characteristics of the fronthaul link, using information from a second-layer protocol to change parameters in the a first-layer protocol, or other adaptations in how the fronthaul link is used. Such an adaptive fronthaul protocol allows a much more cost effective link, such as a packet-switching network, to be used in the fronthaul link. In some cases, this may allow for deployments without any special provisioning of the fronthaul link by allowing the fronthaul information to be transmitted over standard internet connections.

The orchestration module 262A of the first BBU 260A receives information from the group of RRUs 231A-C and from other orchestration modules, such as the second orchestration module 262B of the second BBU 260B. The information received, along with settings in the first BBU 260A, can be used as the one or more parameters to determine how to assign a RRU from the group of RRUs 230A-C to a particular cluster of RRUs. The information can change over time, and the assignments of the RRUs to the clusters can be changed by the orchestration module 262B in response, to assign the one or more RRUs to the cluster of RRUs dynamically.

In some cases, the BBU 260A and/or the group of RRUs 230A-C are mobile. In one non-limiting example, the one or more parameters include a geographic service area of the BBU 260A. The orchestration module 262A can dynamically assign the one or more RRUs to the cluster of RRUs based on current locations of the group of RRUs 230A-C and the geographic service area of the first BBU 260A.

One particular case of a mobile RRU is having RRUs of the group of RRUs 230A-C mounted on ground-based vehicles or on unmanned aircraft systems (UAS). As the vehicle or UAS moves the RRUC, the orchestration module 262A can dynamically assign the RRU to an appropriate cluster of RRUs, based on its current position, or other parameters. In some embodiments, the orchestration module 262A can send commands to the UAS to dynamically position the group of RRUs 230A-C based on the one or more parameters. In one example, locations of the first mobile terminal 210A, the second mobile terminal 210B, and the third mobile terminal 210C are determined using location information from the GPS receivers in the mobile terminals 210A-C that is provided to the group of RRUs 231A-C and then to the first BBU 260A. Additionally or alternatively, signal strengths reported by the mobile terminals 210A-C and/or the group of RRUs 231A-C may be used to estimate positions of the mobile terminals 210A-C. The locations of the mobile terminals 210A-C are then used to determine positions for the group of RRUs 231A-C and the first orchestration module 262A sends flight path information to the UASs carrying the RRUs 231A-C to move them to their determined positions.

The one or more parameters that are used to assign RRUs to the cluster of RRUs can include a wide variety of parameters. Examples of such parameters include, but are not limited to, numbers of mobile terminals 210A-C in active communication with the group of RRUs 230A-C, radio measurements performed by the group of RRUs 230A-C, radio measurements performed by the mobile terminals 210A-C, synchronization states of the group of RRUs 230A-C, a fronthaul link quality parameter, geographic locations of the group of RRUs 230A-C, geographic locations of mobile terminals 210A-C in active communication with the group of RRUs 230A-C, or any combination thereof. The fronthaul link quality parameter may be determined based on information received from the group of RRUs 230A-C over the fronthaul link, such as, but not limited to, RRU buffer status information, RRU buffer overrun indications, RRU buffer underrun indications, information about a received radio frequency signal, or any combination thereof. In some cases, the fronthaul link quality parameter is determined by the BBU 260A based on data gathered in the BBU 260A, such as, but not limited to a latency of the fronthaul link, a bandwidth of the fronthaul link, errors on the fronthaul link, undelivered packets on the fronthaul link, out-of-order packets on the fronthaul link, buffer overruns, buffer underruns, or any combination thereof.

The one or more parameters are then used to assign the RRUs to various clusters of RRUs, such as assigning one or more RRUs of the group of RRUs 230A-C to a first cluster of RRUs that are associated with the first BBU 260A, and in some embodiments, assigning one or more other RRUs of the group of RRUs 230A-C to a second cluster of RRUs that are associated with the second BBU 260B. As one non-limiting example, the one or more parameters include geographic locations of the group of RRUs 230A-C, which includes a building floor. The orchestration module 262A may assign the one or more RRUs to the cluster of RRUs based on the one or more RRUs having a common building floor location. So for example, if the first RRU 230A and the second RRU 230B were to be located on the first floor of a first building, and the third RRU 230C were to be located on the second floor of the first building, the orchestration module 262A could assign the first RRU 230A and the second RRU 230B to be in the first cluster of RRUs that is associated with the first BBU 260A, while that third RRU 230C is assigned to the second cluster of RRUs that is associated with the second BBU 260B.

Once the RRUs are assigned to clusters, the one or more parameters can be used to configure the cluster of RRUs associated with the first BBU 260A. In some cases, the orchestration module includes instructions to set a transmission power of the cluster of RRUs based on the one or more parameters, and/or set a radio frequency used by the cluster of RRUs to communicate with mobile terminals based on the one or more parameters.

In some embodiments, the orchestration module 262A configures the cluster of RRUs to appear as a single base station to a mobile terminal 210A. In some cases, however, the orchestration module 262A configures the cluster of RRUs so that a first RRU 230A of the cluster of RRUs transmits data that is different than data transmitted by a second RRU 230B of the cluster of RRUs during at least some time periods. As a non-limiting example, this may be done to allow the first RRU 230A to communicate with the first mobile terminal 210A simultaneously with the second RRU 230B communicating with the second mobile terminal 210B, using the same frequency, where the two RRUs are at a great enough distance from each other that they do not interfere with each other, or by using beam shaping to direct the signal from each RRU so that they don't cause interference. Thus, the orchestration module 262A may configure a first RRU 230A of the cluster of RRUs to communicate with a first mobile terminal 210A and configure a second RRU 230B of the cluster of RRUs to communicate with a second mobile terminal 210B based on geographic locations of the first RRU 230A, the second RRU 230B, the first mobile terminal 210A, and the second mobile terminal 210B. The geographic location may be an actual geographic position (e.g. a latitude and longitude) or it may be a signal strength between a RRU and a mobile terminal, which can give an approximation of distance between the two. So the first orchestration module 262A may configure a first RRU 230A of the cluster of RRUs to communicate with a first mobile terminal 210A and configure a second RRU 230B of the cluster of RRUs to communicate with a second mobile terminal 210B based on radio measurements performed by the cluster of RRUs, the first mobile terminal 210A, or the second mobile terminal 210B. As another non-limiting example the orchestration module 262A may configure a first RRU 230A of the cluster of RRUs to only transmit to a mobile terminal 210A, and configure a second RRU 230B of the cluster of RRUs to only receive from the mobile terminal 210A.

The first BBU 260A may determine that the first RRU 230A of the cluster of RRUs has failed. This may be accomplished by the networking module 264A determining that the failure based on communication parameters, by the orchestration module 262A based on parameters received from the first RRU 230A, or by other means. Upon determining that the first RRU 230A has failed, the BBU 260A may hand over a mobile terminal 210A associated with the first RRU 230A to a second RRU 230B of the cluster of RRUs.

In some embodiments, the orchestration module 262A may determine that a predetermined capacity threshold of the BBU 260A has been exceeded. The orchestration module 262A may then change a parameter in the cluster of RRUs or a mobile device in communication with the cluster of RRUs in response to the determination that the predetermined capacity threshold of the BBU has been exceeded. By changing a parameter, along with other actions in some cases, one or more of the following may be performed:
  a handover of a mobile terminal to another BBU;
  a reduction in a throughput for the mobile terminal;
  a reduction in a resource block allocation;
  a change in a modulation and coding scheme for the cluster of RRUs;
  a suspension of unicast uplink scheduling in the cluster of RRUs for one or more scheduling intervals; or
  a suspension of unicast downlink scheduling in the cluster of RRUs for one or more scheduling intervals.

The first orchestration module 262A of the BBU 260A may coordinate with the second BBU 260B that includes a second orchestration module 262B and a second networking module 264B. This may include the first orchestration module 262A further coordinating RAN parameters with the second BBU 260B. In another non-limiting example, if the orchestration module 262A determines that a first RRU 230A of the cluster of RRUs has failed, the orchestration module 262A may move a mobile terminal 210A associated with the first RRU 230A to a second RRU 230B, where the second RRU 230B is associated with a second cluster of RRUs that is associated with the second BBU 260B.

In another example of coordination with a second BBU 260B, the first orchestration module 262A may move the first RRU 230A from the cluster of RRUs to a second cluster of RRUs associated with the second BBU 260B. This may be done in response to a physical movement of the first RRU 230A, a loading condition of the first BBU 260A, a number of mobile terminals 210A-C in communication with the first RRU 230, or for other reasons. To accomplish moving the first RRU 230A from the first cluster of RRUs to the second cluster of RRUs, the first orchestration module may perform any combination of the following tasks:
  hand over a mobile terminal associated with the selected RRU to another RRU of the cluster of RRUs;
  change a parameter associated with the mobile terminal in the BBU;
  send a command to the mobile terminal;
  send a deactivation command to the selected RRU;
  inform the selected RRU that it is associated with the second BBU; or
  set synchronization parameters in the selected RRU that are compatible with the second BBU.

In some embodiments, the first orchestration module 262A may determine that the loading of the first BBU 260A is too high and through coordination with the second orchestration module 262B, that the loading on the second BBU 260B is such that it is unable to accept any additional load. The orchestration module 262A may then determine to instantiate a third BBU 260C to handle some of the load. In some embodiments, a new virtual machine 206C may be created on a server 204B already assigned to the RAN 200, on a newly assigned server, or through a public cloud computing server. Once the new virtual machine 206C is created, the software that implements the third BBU 260C can be started, including its third orchestration module 262C and third networking module 264C. The first orchestration module 262A can then coordinate with the third orchestration module 262C to migrate part of the load from the first BBU 260A to the newly instantiated third BBU 260C. This migration may include moving one or more RRUs, such as the third RRU 230C from the first cluster of RRUs associated with the first BBU 260A, to a third cluster of RRUs associated with the third BBU 260C. It also may include transferring communication with one or more mobile terminals, such as the third mobile terminal 210C from the first RRU 230A to the third RRU 230C which is now associated with the third BBU 260C.

The ability to dynamically manage the number of BBUs allows for easy and automatic RAN configuration. The ready availability of computing resources through public cloud services, such as Amazon AWS, means that the RAN can be created with minimal capital investment, as the RRUs are relatively inexpensive and the existing internet infrastructure can be used for both the fronthaul and backhaul, which also reduces the capital expenditure required to deploy a RAN.

Figure 3:
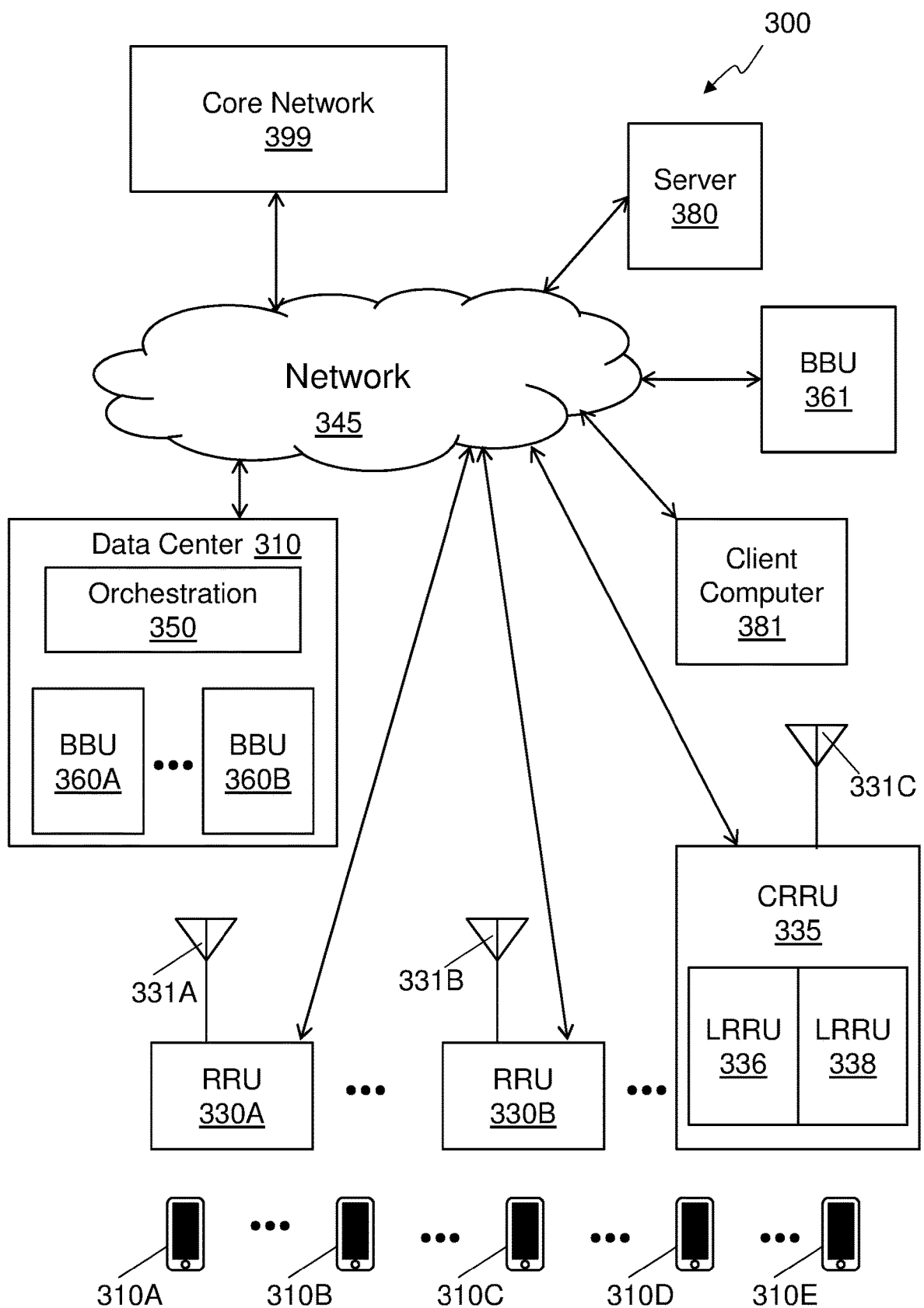
FIG. 3 is a block diagram of an alternative embodiment of a distributed RAN.

In FIG. 2 and FIG. 3, as well as other figures of this disclosure, arrows connecting different building blocks may represent physical media (e.g., an optical fiber or twisted pair copper wires) or logical data and/or control pipes (e.g., based on the internet protocol). Such logical connections may be conveyed over a shared or dedicated physical medium. In addition, blocks required for correct network functionality (e.g., routers, switches, gateways, and the like) may be present, although they are not explicitly represented in the figures of the present disclosure.

FIG. 3 is a block diagram of an alternative embodiment of a distributed RAN 300. The RAN 300 utilizes an adaptive fronthaul link protocol to allow communication between a BBU and a RRU to occur through a network such as the network 345. This adaptive fronthaul link protocol is described in more detail in published international patent application WO 2016/145371 A2, entitled DISTRIBUTED RADIO ACCESS NETWORK WITH ADAPTIVE FRONTHAUL and published on Sep. 15, 2016. The RAN 300 includes multiple BBUs 360A-B in a data center 310 that are coupled to multiple RRUs 330A-B, 336, 338 through the network 345. The network 345 may include any configuration of networks, including portions that traverse the internet, although in some embodiments, local networks may be formed between certain BBUs and certain RRUs. Each RRU 330A-B, 336, 338 is coupled to an antenna 331A-C to communicate with wireless terminals, or user equipment (UE), 310A-E. The BBUs 360A-B in the data center 310 may be coupled to a core network 399, such as an EPC of an E-UTRAN through the network 345 or through a private network.

In some embodiments, the distributed RAN 300 may sometimes be referred to as a Cloud-RAN 300. The RAN 300 is a radio frequency communication system to facilitate communication between a plurality of mobile terminals 310A-E and a core network 399. The RAN 300 includes a group of remote radio units (RRUs) 330A-B, 336, 338, each RRU of the group of RRUs coupled to an antenna 331A-C to communicate with at least some of the plurality of mobile terminals 310A-E and including electronic circuitry to perform at least a first portion of a first-level protocol of a radio access network (RAN) 300 and communicate over a fronthaul link, which in this embodiment includes the network 345. The RAN 300 also includes a baseband unit (BBU), such as BBU 361, coupled to the core network 399 and the fronthaul link. In the embodiment shown, the network 345 provides the coupling to the core network 399 and the fronthaul link for the BBU 361. The BBU 361 is communicably coupled to the group of RRUs 330A-B, 336, 338 over the fronthaul link, at least in part in this example, through an internet protocol (IP) based network used for internet communication. In some embodiments, the fronthaul link includes a network compatible with an IEEE 802 standard, such as a wireless network compliant with an IEEE 802.11 standard or an IEEE 802.16 standard.

The BBU 361 includes electronic circuitry to assign one or more RRUs selected from the group of RRUs 330A-B, 336, 338, to a cluster of RRUs based on one or more parameters, and to perform at least a second-level protocol of the RAN 300. The BBU 361 may include custom hardware, such as application-specific integrated circuits to implement various aspects of BBU functionality, such as a second portion of the first-level protocol of the RAN 300. In some embodiments, the electronic circuitry of the BBU 361 includes a processor with memory to store executable code, with at least some of the functionality of the BBU 361 implemented as instructions of a computer program. The electronic circuitry of the BBU 361 and/or the orchestration module 350 may perform a variety of functions, including, but not limited to, assigning the one or more RRUs 330A-B, 336, 338 to the cluster of RRUs dynamically, assigning one or more other RRUs 330A-B, 336, 338 of the group of RRUs to a second cluster of RRUs, set a transmission power of the cluster of RRUs based on the one or more parameters, or set a radio frequency used by the cluster of RRUs to communicate with mobile terminals 310A-E based on the one or more parameters.

The one or more parameters can include synchronization states of the group of RRUs 330A-B, 336, 338, a fronthaul link quality parameter, geographic locations of the group of RRUs 330A-B, 336, 338, geographic locations of mobile terminals 310A-E in active communication with the group of RRUs 330A-B, 336, 338, geographic service areas of BBUs 360A-B, 361, or other parameters. In at least one embodiment, the geographic locations of the group of RRUs 330A-B, 336, 338 include a building floor and the orchestration module 350 or the electronic circuitry of the BBU 361 may assign the one or more RRUs 330A-B, 336, 338 to the cluster of RRUs based on the one or more RRUs 330A-B, 336, 338 having a common building floor location. In some embodiments, the group of RRUs 330A-B, 336, 338 are mobile and the orchestration module 350 or the electronic circuitry of the BBU 361 dynamically assign the one or more RRUs 330A-B, 336, 338 to the cluster of RRUs based on current locations of the group of RRUs 330A-B, 336, 338 and the geographic service area of the BBU 361.

The RAN 300 may also include multiple other components, including a data center 310 housing additional BBUs 360A-B and an orchestration unit 350. The additional BBUs 360A-B and orchestration unit 350 may be instantiated on one or more servers and may include software running on a processor of one or more servers. A server 380 is also coupled to the network and may be used to instantiate additional BBUs. A virtual machine may be provisioned on the server 380 and a software program to implement a BBU may then be started within that virtual machine. A client computer 381 may be used for a management console. The client computer 381 may run a RAN management program that couples to the various components of the RAN 300 through the network 345 and allows a RAN administrator to manage various aspects of the RAN 300. Any number of mobile terminals 310A-E may be in active communication with one or more RRUs 330A-B, 336, 338 to access the core network 399, through one or more BBUs 360A-B, 361.

The RAN 300 also includes a compound RRU 335 that includes a single interface circuit coupled to the fronthaul link, a first logical RRU 336 coupled to the single interface circuit, and a second logical RRU 338 coupled to the single interface circuit. The first logical RRU 336 and the second logical RRU 338 are both included as RRUs in the group of RRUs. A BBU may not be able to tell that a logical RRU is not a stand-alone RRU and can treat the stand-alone RRU 330A and the logical RRU 336 as equivalent devices. The logical RRUs 336, 338 within the compound RRU 335, while co-located, can be treated as independent RRUs and set up with different parameters and assigned to the same or different clusters. So as an example, in addition to the cluster of RRUs associated with the BBU 361, a second cluster of RRUs may be assigned from the group of RRUs 330A-B, 336, 338 and associated with the BBU 360A which is also coupled to the fronthaul link. Each RRU of the second cluster of RRUs is included in the group of RRUs 330A-B, 336, 338 and is coupled to the fronthaul link. In this example, the first logical RRU 336 may be included in the cluster of RRUs associated with the BBU 361 and the second logical RRU 338 may be included in the second cluster of RRUs associated with the BBU 360A. The two different BBUs 361, 360A may manage their respective logical RRU 336, 338 separately. In fact, the two BBUs 361, 360A may be operated by two different carriers using different carrier frequencies and different RAN parameters.

As was mentioned above, the electronic circuitry of the BBU 361 can assign one or more RRUs to a cluster or RRUs that is associated with the BBU 361. In some embodiments, however, the orchestration module 350 may do the assigning of RRUs to clusters of RRUs instead of the assigning being done directly by the BBU 361. But independent of which element performed the initial assignment, in an example, the first logical RRU 336 is assigned to a cluster of RRUs associated with the BBU 361, along with several other RRUs that are not shown, and the first RRU 330A and second logical RRU 338 are assigned to a second cluster of RRUs associated with the BBU 360A. The electronic circuitry of the BBU 361 may configure its cluster of RRUs, including the first logical RRU 336, to appear as a single base station to a mobile terminal 310E.

The electronic circuitry of the BBU 360A may configure the first RRU 330A to transmit data that is different than data transmitted by the second logical RRU 338 of the second cluster of RRUs during at least some time periods. The electronic circuitry of the BBU 360A may also configure the first RRU 330A of the second cluster of RRUs to communicate with a second mobile terminal 310B and configure the second logical RRU 338 of the second cluster of RRUs to communicate with a third mobile terminal 310C based on geographic locations of the first RRU 330A, the second logical RRU 338, the second mobile terminal 310B, and the third mobile terminal 310C. The electronic circuitry of the BBU 360A may alternatively configure the first RRU 330A of the second cluster of RRUs to communicate with a second mobile terminal 310B and configure the second logical RRU 338 of the second cluster of RRUs to communicate with a third mobile terminal 310C based on radio measurements performed by the second cluster of RRUs, the second mobile terminal 310B, and the third mobile terminal 310C. In some embodiments, the electronic circuitry of the BBU 361 may configure a second RRU 330B of the cluster of RRUs to only transmit to a fourth mobile terminal 310D, and configure another RRU of the cluster of RRUs to only receive from the fourth mobile terminal 310D. The electronic circuitry of the BBU 360A may determine that a first RRU 330A of the cluster of RRUs has failed, and hand over the second mobile terminal 310B associated with the first RRU 330A to the second logical RRU 338 of the second cluster of RRUs. Alternatively the BBU 360A could, in response to determining that the first RRU 330A has failed, move the second mobile terminal 310B associated with the first RRU 330A to a second RRU 330B, the second RRU 330B associated with a third cluster of RRUs associated with the BBU 360B.

The electronic circuitry of the BBU 361, or the orchestration module 350, may coordinate RAN parameters between the BBU 361 and the second BBU 360A. The electronic circuitry of the BBU 361, or the orchestration module 350, may also coordinate moving a selected RRU, from the first cluster of RRUs to the second cluster of RRUs. As a part of this coordination, the electronic circuitry of the BBU 361, or the orchestration module 350, may perform any combination of:

hand over a mobile terminal 310B associated with the selected RRU to another RRU of the cluster of RRUs;
    change a parameter associated with the mobile terminal in the BBU;
    send a command to the mobile terminal;
    send a deactivation command to the selected RRU;
    inform the selected RRU that it is associated with the second BBU 360A; or
    set synchronization parameters in the selected RRU that are compatible with the second BBU 360A.

The orchestration module 350, or the electronic circuitry of the BBU 361, may determine that a predetermined capacity threshold of the BBU 361 has been exceeded and change a parameter in the cluster of RRUs, or a mobile device 310E in communication with the cluster of RRUs, in response to the determination that the predetermined capacity threshold of the BBU 361 has been exceeded. As a part of the change of the parameter, the BBU may perform one or more of:

a handover of the mobile terminal 310E to another BBU;
    a reduction in a throughput for the mobile terminal 310E;
    a reduction in a resource block allocation;
    a change in a modulation and coding scheme for the cluster of RRUs;
    a suspension of unicast uplink scheduling in the cluster of RRUs for one or more scheduling intervals; or
    a suspension of unicast downlink scheduling in the cluster of RRUs for one or more scheduling intervals.

If a centralized orchestration module 350 is used, when a new RRU becomes available for use, it connects and advertises itself to the orchestration module 350. A negotiation process is carried out between the new RRU and the orchestration module 350. The negotiation may include any combination of information about new RRU location and capabilities, radio measurements, synchronization information and command, network listening commands and results, logs and status of the new RRU, logs and status of the orchestration module 350, logs and status of one or more BBU instances, or other parameters.

After completion of the negotiation, also known as handshake, the orchestration module 350 may redirect the new RRU to either an existing BBU, or a newly created BBU instance. This redirection, or assignment, may be performed by sending an identifier of the BBU instance, such as an IP address, to the new RRU along with a special redirection command. The redirection command may include additional commands and information, such as synchronization and measurements commands. The receiving BBU instance may also be informed about the incoming RRU.

Alternatively, rather than being redirected to a BBU instance, the new RRU may be rejected. The new RRU may then sleep for a predefined amount of time, or for an amount of time decided by the orchestration module 350, or until a certain event occurs, before trying to reconnect to the orchestration module 350. The orchestration module 350 also may at any time (e.g. when a new RRU connects to the system) decide to migrate an existing RRU from a first BBU instance to a second BBU instance (existing, or to be created on the fly).

The decision on which BBU instance to redirect the new RRU, or whether to reject the new RRU, may be based on any combination of a number of RRUs associated to each running BBU instance, system load and memory usage of each running BBU instance, available resources (e.g. computational capacity, volatile memory, storage, network, and the like) of each virtual machine, a network load of each running BBU instance, a fronthaul state, characteristics of running BBU instances, synchronization information, radio measurements reported by the new RRU, or other parameters. If known, information on the topology of the fronthaul network connecting BBUs and RRUs may be used to make decisions on what BBUs to associate to what RRUs. In some embodiments, variations of the fronthaul topology (or estimates thereof) may be tracked over time based on information provided by RaaS-FIP or other fronthaul transport protocols.

BBU instances may report information to the orchestration module 350, or exchange information with other BBU instances. Such information may be time-driven information (e.g. periodically-reported information) or event-driven information. Events that may trigger such information to be reported may include system overloading (in terms of computational resources, memory, radio throughput, fronthaul throughput, number of RRUs, number of users, and the like), synchronization events, RRU faults, or other events. Information may include a system load (in terms of computational resources, memory, radio throughput, fronthaul throughput, number of RRUs, number of users, and the like), fronthaul state and statistics, radio measurements, or the like.

Occasionally a mobile terminal may have to be handed over from a first cluster of RRUs (associated to a first BBU instance) to a second cluster of RRUs (associated to a second BBU instance). The decision on whether to perform a handover may be taken by the first BBU instance and may be assisted by the orchestration module 350. In some embodiments, the orchestration module 350 may use information from the first BBU instance and at least one other active BBU instance to decide whether to perform the handover, and to decide the identity of the second BBU instance.

RRUs may be dynamically configured by their controlling BBU instance, with the possible assistance of the BBU stack or a separate orchestration module, by sending special configuration commands to the RRUs over fronthaul link using the RaaS-FIP protocol. The configuration commands may include, but are not limited to, a synchronization command, a power control command, a network listening command, a poweroff command, a frequency retuning command, or other RaaS-RIP commands. In one non-limiting example that may be referred to as "cell breathing," the controlling BBU may send a poweroff command to a RRU when a certain condition is detected. For example, in low RAN traffic conditions, the controlling BBU may decide to save resources by turning off one RRU. In another example of "cell breathing," the controlling BBU may send a "reduce transmit power" command to a RRU located in the proximity of another RRU that recently turned on, or increased its transmit power. In another example of "cell breathing," the controlling BBU may send an "increase transmit power" command to a RRU located in the proximity another RRU that recently turned off, or decreased its transmit power.

A logical communication channel (e.g., a network connection) may be established between the orchestration module 350 and running BBU instances, as well as among BBU instances. That communication channel may be used for coordination among BBU instances and between the orchestration module 350 and the BBU instances. Information transferred over the control channel may include BBU instance status and logs, error codes, system load, and the like.

A BBU instance may dynamically command an associated RRU to perform a frequency retuning, transmit power adaptation, temporary shutoff of one or more of the available transceivers, a network listening, a geographical location evaluation, an entry or exit of a power-saving "sleep" mode of operation, or the like. The command may be delivered via a control plane of the RaaS-FIP protocol, and reception of the command may be acknowledged by the RRU. Decisions on whether to send the command may be taken by the BBU in cooperation with other BBU instances, the orchestration module 350, or a combination thereof.

In another embodiment, all the orchestration features described so far can be performed in a distributed way among the running BBU instances. In such embodiments, a centralized orchestration module 350 may be absent, and orchestration modules may be present in one or more of the running BBU instances as shown in FIG. 2. In such embodiments, a RRU boots up and connects to a BBU instance to perform an handshake. The BBU instance may be chosen at random, or according to history, radio measurements, geographical location, or other parameters. The choice of the BBU instance may be performed independently by the RRU or by a specialized module that provides identifiers (e.g., IP addresses) of one or more active BBU instances. During or after the handshake process, the RRU may be assigned by the BBU instance to its cluster or RRUs, or may be migrated to a different BBU instance, either an existing BBU instance or a new BBU instantiated on-the-fly. The migration may be coordinated by the first BBU instance.

In another embodiment, if the RRU is rejected by the first BBU instance, the RRU may try a connection to a second BBU instance, and may sequentially try all known BBU instances until it is added to a cluster of RRUs by a BBU instance or until all the known BBU instances have been visited. In the latter case, the RRU may refrain from reconnecting for a predefined amount of time, or until a certain event occurs. The list of identifiers (e.g., IP addresses) of the BBU instances may be provided to the RRU via a name server, a suitable software module devoted to this purpose, or may be hardcoded into the RRU firmware.

A RRU may be handed over from a first BBU instance to a second BBU instance for various reasons. The migration may involve any combination of the following actions:

handing over some of the mobile terminals associated to the cell corresponding to the first BBU instance to different cells;

changing parameters associated to a the mobile terminal associated to the cell corresponding to the first BBU instance;

sending commands (e.g., power control, carrier activation/deactivation, and the like) the mobile terminal in active communication with a cluster of RRUs associated with the first BBU instance;

sending a deactivation command to the RRU;

informing the RRU of the new BBU instance to associate to; and informing the RRU of the synchronization parameters for the next BBU instance to associate to.

Occasionally a RRU may be turned off by the network. A similar combination of steps as described above may take place in this case, except that the RRU may not reconnect to a second BBU instance right away, but may sleep for a pre-defined amount of time, or until a certain event occurs.

Multiple orchestration modules may be running concurrently on different nodes. In embodiments, the tasks performed by the orchestration module may be spread among the modules (for load balancing). In case of a fault in one of the BBU instances causing the BBU to stop working properly, the orchestration module 350 or orchestration modules of other BBUs may recognize the problem and may migrate the RRUs associated with the failed BBU instance to different BBU instances. In case of a RRU failure, the BBU instance controlling the RRU may recognize the failure and may instruct the mobile terminals associated to the RRU to perform a handover, carrier activation/deactivation, power control, random access, RRC connection reestablishment or reconfiguration, or the like.

In some cases, a single RRU may be in communication with multiple BBUs. This may be referred to as multi-homing. In one embodiment, a primary BBU instance may be configured to control the RRU, and at least another BBU instance may interact with the RRU for other interaction, such as for retrieving information (e.g. radio measurements, synchronization information, and the like). The other BBU instance may not have full control of the RaaS-FIP data plane for communicating with the RRU. In another embodiment, the two BBU instances may not be coordinated and the RRU may be independently controlled by multiple BBU instances. In another embodiment, the two BBU instances may have some form of slow-scale coordination (either via direct connections, or through a centralized operator-agnostic controller) allowing them to effectively hand the RRU back and forth between the two BBUs. In another implementation, a single carrier frequency may be controlled by multiple BBU instances. The RRU may multiplex/demultiplex data transmission and reception according to the RaaS-FIP protocol links open toward each of the BBU instances.

Figure 4:
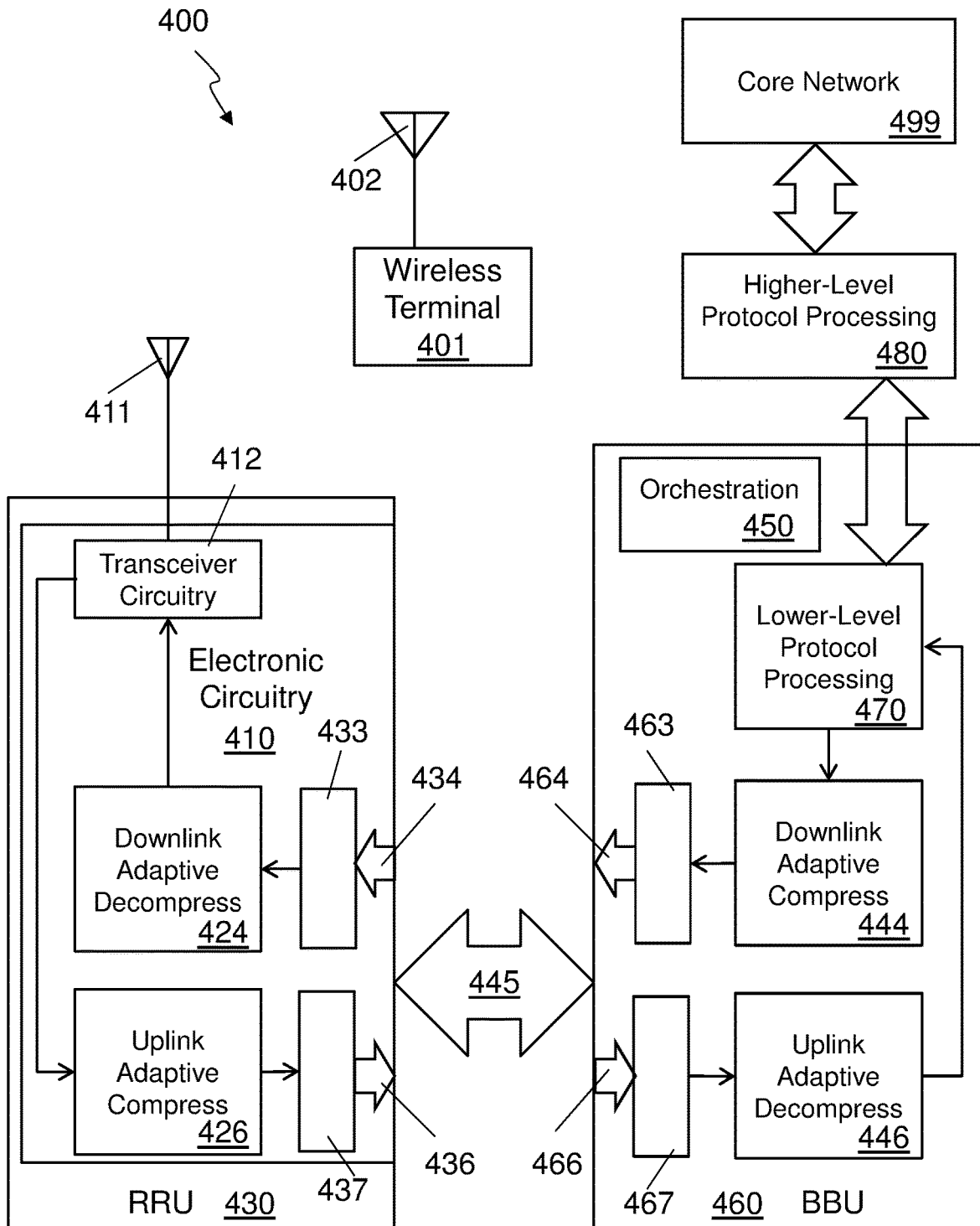
FIG. 4 is a detailed block diagram of an embodiment of a distributed RAN.

FIG. 4 is a detailed block diagram of an embodiment of a distributed RAN 400. The RAN 400 includes a remote radio unit (RRU) 430 coupled to an antenna 411, and a baseband unit (BBU) 460 coupled to the core network 499. A fronthaul link 445 is coupled to the BBU 460, through interface circuitry 464, 466, and the RRU 430. The fronthaul link 445 utilizes an adaptive fronthaul protocol for communication between the BBU 460 and the RRU 430. The RRU 430 includes electronic circuitry 410 to perform at least a first portion of a first-level protocol of a radio access network (RAN) 400 for communicating between the wireless terminal 401 and the core network 499. The BBU 460 includes a networking module that includes electronic circuitry to perform at least a second-level protocol of the RAN 400 in the lower level protocol processing block 470. The RAN 400 provides the wireless terminal 401 with access to the core network 499 through an RF signal sent between the antenna 402 of the wireless terminal 401 and the antenna 411 of the RRU 430. The BBU 460 may be coupled to the core network 499 through a computing system that provides higher level protocol processing 480, or in some cases, the higher level protocol processing 480 may be included in the BBU 460.

In embodiments, the electronic circuitry 410 of the RRU 430 includes receiver circuitry, shown as transceiver circuitry 412, to receive a radio frequency signal from the antenna 411 and convert the received radio frequency signal to digital baseband samples. The transceiver circuitry 412 may include sub-circuits, such as conversion circuitry and/or RF circuitry. The electronic circuitry 410 also includes adaptive compression circuitry 426 to adaptively compress the digital baseband samples into fronthaul uplink information based on information received from the BBU 460 over the fronthaul link 445, and interface circuitry 436 to send the fronthaul uplink information to the BBU 460 over the fronthaul link 445 using the adaptive fronthaul protocol. In some systems the adaptive compression performed by the adaptive compression circuitry 426 is lossy. The BBU 460 may include an uplink adaptive decompression block 446 as a part of the networking module to decompress the uplink data received from the RRU 430.

The BBU 460 may be configured to send frequency-domain information over the fronthaul link 445 to the RRU 430. The frequency-domain information may include a tonemap descriptor describing a set of tones to be used by the RRU 430 to generate a radio frequency signal for transmission to the wireless terminal 401, and data identifying modulation symbols for tones of the set of tones, and times associated with the modulation symbols. This representation of the frequency-domain information is a form of adaptive compression performed by the downlink adaptive compression block 444, which is also a part of the networking module in this embodiment.

In systems, the RRU 430 receives data from the BBU 460 over the fronthaul link 445 using the interface circuitry 434. The electronic circuitry 410 of the RRU 430 may include downlink adaptive decompression circuitry 424 that has expansion circuitry to generate complex frequency-domain samples based on the data identifying the modulation symbols for the tones, and inverse Fourier transform circuitry to create complex time-domain baseband samples from the complex frequency-domain samples. The electronic circuitry 410 may also include transmitter circuitry, shown as transceiver circuitry 412, to convert the complex time-domain baseband samples into a radio frequency signal to send to the wireless terminal through the antenna 411 at the times associated with the modulation symbols.

In various embodiments, the RRU 430 may include a buffer 433 to hold irregularly received downlink data from the fronthaul link 445 to enable a constant stream of information to be provided for a radio frequency signal sent to the wireless terminal 401. A size of the buffer 433 may be adapted based on a fronthaul quality indicator or information received from the BBU 460. The RRU 430 may include a buffer 437 to hold irregularly sent uplink data for the fronthaul link 445 to enable a constant stream of information to be received from a radio frequency signal sent by the wireless terminal. A size of the buffer 437 may be adapted based on a fronthaul quality indicator or information received from the BBU 460. The BBU 460 may also include an uplink buffer 467 and/or a downlink buffer 463.

In some systems, the BBU 460 can determine an indicator of fronthaul link quality, and dynamically change one or more parameters of the RAN 400 based on the indicator. The indicator of fronthaul link quality may be determined based, at least in part, on information received by the BBU 460 from the RRU 430. The information received by the BBU 460 from the RRU 430 may include RRU buffer status information, RRU buffer overrun indications, RRU buffer underrun indications, information about a received radio frequency signal, or any combination thereof. In some systems the indicator of fronthaul link quality is determined based, at least in part, on a latency of the fronthaul link 445, a bandwidth of the fronthaul link 445, errors on the fronthaul link 445, undelivered packets on the fronthaul link 445, out-of-order packets on the fronthaul link 445, BBU buffer overruns, BBU buffer underruns, or any combination thereof. The one or more parameters of the RAN 400 may include frequency-domain allocation size, modulation and coding schemes, number of users, number of grants, pattern of usable subframe, anticipation of scheduling with respect to a time index it refers to, or any combination thereof. In at least one embodiment, the indicator of fronthaul link quality includes a latency of the fronthaul link, and the one or more parameters of the RAN include a ra-ResponseWindowSize parameter in a MAC protocol of an E-UTRA network.

The BBU 460 also may include an orchestration module 450, although in some embodiments, the orchestration module is separate from the BBU 460. The orchestration module may include any combination of electronic circuitry and computer instructions to be executed by the electronic circuitry. In some embodiments, the orchestration module may be built using application-specific integrated circuits to provide most, if not all, of the functionality of the orchestration module 450. In other embodiments, the orchestration module 450 may be a software program running on a standard computer. Other embodiments may have a mix of special-purpose circuitry and software running on a processor.

The orchestration module 450 may assign RRUs to clusters. The RRUs belonging to a single cluster of RRUs are controlled by the same BBU, thus allowing for tighter coordination. So as an example, the RRU 430 may be included with other RRUs in a cluster that is controlled by the BBU 460. Examples of how a cluster of RRUs can be coordinated include, but are not limited to, a joint scheduling, beamforming, joint reception and/or decoding, interference coordination and management via resource partitioning. In some cases, RRUs belonging to the same cluster may be seen by the mobile terminal as a single base station, thus eliminating the need for handovers when the terminal crosses RRU boundaries. The orchestration module 450 may also assign a RRU to a cluster of RRUs based on geographical metrics (e.g., RRUs in the same floor of a building), or radio metrics (e.g., RRUs whose transmit signal interfere on each other). Moving RRUs in or out of a cluster may be done dynamically, based on measurements that detect changes in the relevant metrics (geographical, or radio, or the like). In some embodiments, the orchestration module 450 is aware of the position, or the approximate position, of the mobile terminal 401 and may decide to cluster together RRUs that are close to the mobile terminal 401, where close may be in terms of geographical metrics, radio metrics, or other parameters. The cluster selections may be updated in reaction to a mobile terminal moving from one location to another.

The orchestration module 450 may also coordinate RRUs belonging to different clusters, but the type of coordination (e.g., its time scale) may be different than coordination among RRUs of the same cluster. For example, slow-scale resource partitioning may be deployed across different clusters as a form of interference management.

The partitioning of the available RRUs into clusters also may be based on, but not limited to, a number of active mobile terminals, fronthaul quality (e.g., measured or estimated throughput and latency between the BBU and each RRU), radio measurements performed by the RRUs, radio measurements performed by the mobile terminals and reported to the network, synchronization state (e.g., whether a certain RRU is time/frequency/phase synchronized with the remaining RRUs, and to which extent). The partitioning may dynamically change based on new RRUs entering the network, RRUs going offline, mobile terminals moving within the coverage area of the RaaS deployment, changes in fronthaul quality, and the like.

The orchestration module 450 may also set a variety of parameters in the cluster of RRUs. For example, transmission power of a RRU may be decided by the associated BBU based on the same set of parameters used to determine clusters. In some cases a RRU may be turned off to save fronthaul and computational resources based on the same set of parameters used to determine clusters. Different RRUs may all work on the same carrier frequency, or may be assigned different carrier frequencies by the BBU, based on the same set of parameters used to determine clusters. Frequencies may belong to licensed or unlicensed spectrum. In the latter case, RRUs may be instructed by the BBU to perform measurements and sensing such as the listen-before-talk. In a heterogeneous network deployment, where RRUs have lower power signals and an existing macro network of higher-power cells is available, RRUs may use the same frequency as the underlying macro cell or different frequencies. In either case the RRUs may be time and/or phase and/or frequency synchronized with the underlying macro network, and may perform coordination techniques with the underlying macro network under control of the BBU. In one implementation, the RRUs may be configured in a carrier-aggregation system with the underlying macro network.

The orchestration module 450 may perform scheduling for a portion of the RAN 400. Uplink (UL) scheduling, performed at the BBU 460, may include, but is not limited to, one or more of the selection of mobile terminals, resource block (RB) allocations, modulation coding scheme (MCS), RRUs to include in the cluster of RRUs (e.g. reception points), compression scheme, and resources assigned to the RRUs, such as time-frequency resources, receive antennas, and quantization level. The UL scheduling is performed on a specific time interval known as transmission time interval (TTI).

Besides the traditional metrics used to perform the scheduling (e.g., pending data for each terminal, channel qualities, and the like), scheduling in a distributed RAN may be also be based on a fronthaul quality (e.g., measured or estimated fronthaul throughput and latency) for each candidate RRU, a fronthaul state (e.g., size of the fronthaul queues at either the BBU side or RRU side), a synchronization state (e.g., whether the RRU is frequency/phase/time synchronized, and to which extent), a BBU load (e.g., in terms of queued workers, jobs, threads, and the like), or other parameters.

Demodulation of uplink signals for a co-scheduled user can be performed by multiple RRUs, by requiring the one or more RRUs to report waveforms, receive signals, or perform other tasks corresponding to the uplink signals. Selection of which RRUs to use as reception points of a certain uplink signal may be based on knowledge of the position, or the approximate position, of the mobile terminal that transmits that signal. In one implementation, the position of a mobile terminal may be estimated and tracked over time. As an example, the BBU may detect whether or not a RRU is close to a certain mobile terminal based on the quality of the reception of the signal transmitted by the mobile terminal, where quality may be signal power, signal-to-noise ratio, or other radio measurement. Similarly, downlink signal metrics may be used for position estimation and tracking.

At least one RRU of the cluster of RRUs may use different compression schemes, set of resources, subset of antennas, or be otherwise configured, than another RRU of the cluster of RRUs. The configuration of the RRUs may depend on the required channel quality, target decoding performance, radio measurements, fronthaul qualities and states, and the like. If multiple mobile terminals are scheduled with at least partially overlapping resources, a joint or iterative demodulation or decoding scheme may be used. Periodicity and other parameters (e.g., resources, codes, etc.) related to control signals such as PUCCH, SRS, or the like, may be based at least in part on a fronthaul quality (e.g., measured or estimated fronthaul throughput and latency) for each candidate reception point, fronthaul state, synchronization state, or the like.

The orchestration module 450 may also be used for downlink (DL) scheduling. Downlink scheduling may include the selection of mobile terminals, RB allocations, MCS, RRUs to include in the cluster of RRUs (e.g. transmission points), compression scheme, beamforming, and resources assigned to the RRUs, such as time-frequency resources, and transmission antennas. The DL scheduling is performed on the TTI.

Different RRUs may be instructed to transmit the same signal. This may be accomplished using a broadcast or multicast signaling method over the fronthaul (e.g. an Ethernet broadcast packet) to convey the same signal to the at least two RRUs. In another implementation, different RRUs may be instructed to transmit different signals. The transmitted signals may convey different data streams, the same data streams but with different beamforming, a different but partially overlapping set of data streams, or a combination thereof. Selection of which RRUs to use for transmission of a certain downlink signal may be based on knowledge of the position, or the approximate position, of the mobile terminal that receives that signal. In one implementation, the position of a mobile terminal may be estimated and tracked over time.

Selection of users to serve, MCS, resources, beams, RRUs, transmission powers, and the like, may be based on a quality of synchronization of the connected RRUs, fronthaul quality a RRU, fronthaul state for a RRU, synchronization state of a RRU, load of a BBU (e.g., in terms of queued workers, jobs, threads, and the like), or the like. In one non-limiting example, a RRU might not be used for transmission while it is experiencing a higher fronthaul latency, or a lower fronthaul throughput, than other RRUs.

Different DL signal categories may be transmitted by different RRUs. In example implementation, a set of RRUs within a cluster or RRUs may be used to transmit broadcast signals, such as the primary synchronization sequence (PSS), and a different set of RRUs within the cluster of RRUs may be used to transmit unicast signals, such as a PDSCH for a specific mobile terminal. This partitioning and assignment of signals and signal categories to RRUs may be based at least in part on a fronthaul quality.

Different DL signal categories for the same TTI may be scheduled by the BBU at different times. As a non-limiting example, a broadcast signal may be scheduled in advance compared to another unicast signal. This advance period may be selected and possibly disabled based at least in part on a fronthaul quality.

In some embodiments, the orchestration module 450 may utilize a single RRU for UL only or for DL only. In some embodiments, a particular RRU may be designed as a reception point only, and may not include transmission circuitry, or transmission circuitry may be present but not used. In some embodiments, a compound RRU may be formed from a RRU by allowing separate configuration of its DL and UL sections so that one logical RRU is DL only and one logical RRU is UL only. An UL only RRU can be recognized by the orchestration module 450 which will then use it only as a reception point.

In some embodiments, a particular RRUs may be designed as a transmission point only, and may not include reception circuitry, or the reception circuitry may be present but not used or used to receive different signals, such as synchronization signals. In some embodiments, a compound RRU may be formed with the transmission circuitry being used for a transmission only logical RRU. Such DL RRUs can be recognized by the orchestration module 450 which will then use them only as transmission points. Transmission may occur on the same carrier frequency for all RRUs in a cluster of RRUs, or different RRUs of the cluster of RRUs may use different frequencies. Transmission may occur on the same carrier frequency as the underlying macro network, or on a different one, depending on the embodiment. The carrier frequency may be in unlicensed spectrum. Carrier aggregation may be used to aggregate carrier frequencies from different RRUs, and/or from a macro cell and a RRU.

In some embodiments, one or more RRUs may be used as broadcast devices. This means that they may be time, frequency, and/or phase synchronized, and they may be instructed by the BBU to transmit the same data stream. This may be used for certain functionality defined by the LTE-Broadcast standard. RRUs involved in a broadcast transmission may be selected according to their location, radio measurements, synchronization state, or other parameters.

The orchestration module 450 may also coordinate multiple BBUs. The BBUs being coordinated may be deployed on the same server or virtual machine, on different servers, on different virtual machines on the same server, or on different virtual machines on different servers. BBUs may be adaptively moved among different virtual machines with different resources based on a status of the BBUs, such as throughput, number of users, number of jobs and processes, and the like.

BBUs allocated to the same virtual machine may share a software module (denoted as worker pool) that distributes and load balances workers, jobs, tasks, threads, or the like, among the BBUs, based on a BBU's load, length of queues, fronthaul latencies, fronthaul throughput, number of active users, and the like. If the worker pool gets overloaded, scheduling of the BBUs using the worker pool may be adapted accordingly, such as by performing a throughput reduction, a resource block (RB) allocation reduction, a modulation and coding scheme (MCS) reduction, and the like. In another embodiment, unicast scheduling (UL, DL, or both) may be suspended for one or more scheduling intervals in order to reduce the loading of the worker pool, whereas scheduling of broadcast signals may continue.

Coordination in a cluster of RRUs, such as coordinated multi-point, joint scheduling, soft handovers, frequency selection, or the like, may be performed either by a centralized orchestration unit, an orchestration unit integrated into the BBU that controls the cluster of RRUs, or via direct coordination among the cluster of RRUs. In the latter case, a special RRU-to-RRU fronthaul protocol may take care of exchanging control and data information needed for coordination across the cluster of RRUs. The information may include waveform samples (possibly in compressed format) in time-domain, frequency-domain or other representation, radio measures, synchronization parameters, and the like.

An orchestration layer running in the cloud, or one or more orchestration modules 450 integrated into a BBU 460, or a combination thereof, may be responsible for deciding handovers, that is, changing the RRU servicing a mobile terminal. The decision on whether to perform a handover, and which RRU to hand the mobile terminal to, may be based on a fronthaul quality, a fronthaul state, synchronization state, load of the BBU 460, or the like. System, network, and radio parameters such as number of carriers, bandwidth of each carrier, value of timers, periodicity of signals (such as reporting of radio measurements), thresholds, services offered, and the like, may be optimized and/or dynamically adapted by the orchestration module 450.

Figure 5:
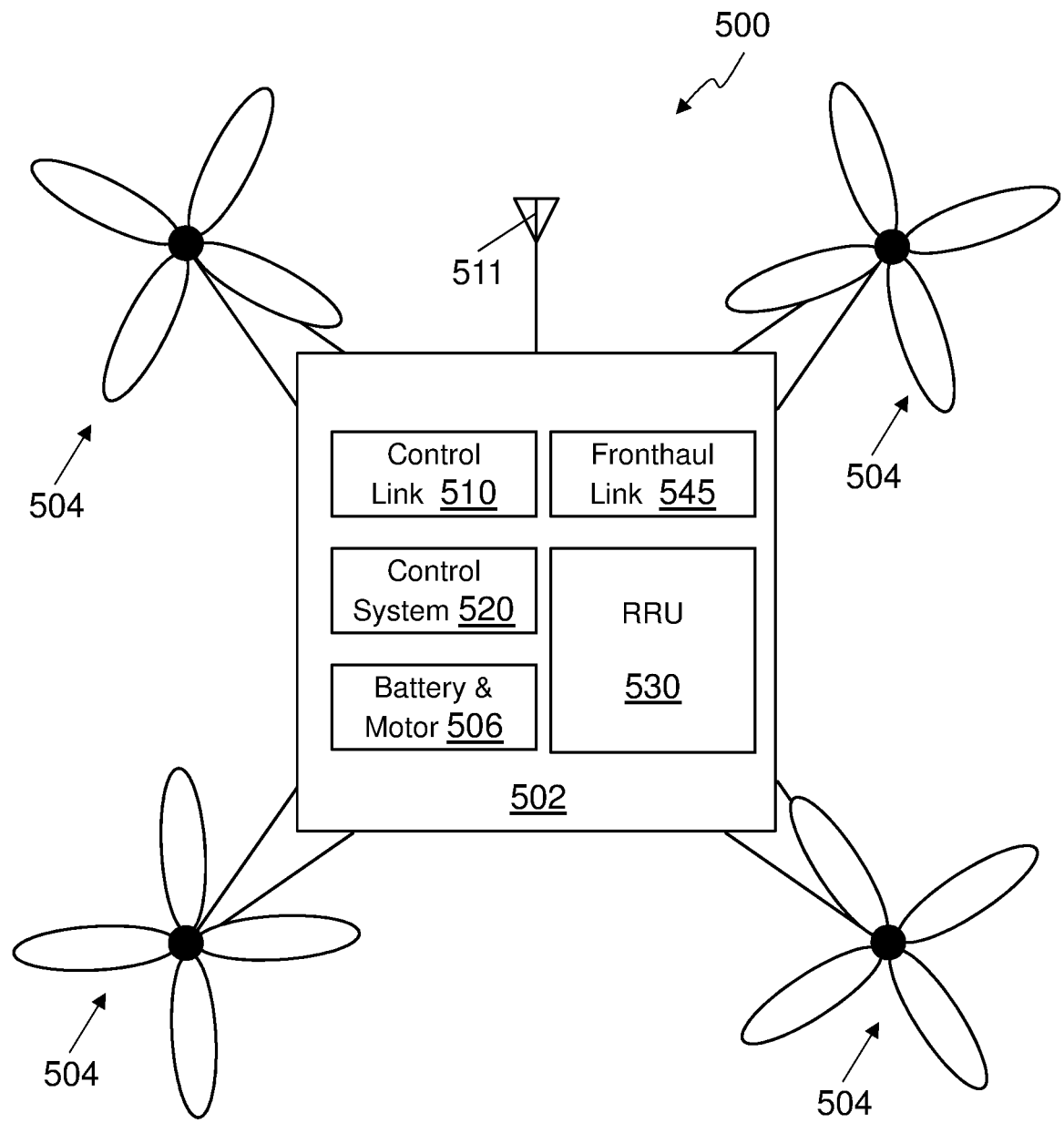
FIG. 5 is a block diagram of an embodiment of unmanned aircraft system (UAS) carrying a remote radio unit (RRU)

FIG. 5 is a block diagram of an embodiment of unmanned aircraft system (UAS) 500 carrying a remote radio unit (RRU) 530. While a quadcopter UAS 500 is shown, other types of UASs can be used, including aircraft with hover capability and aircraft that must sustain forward motion to maintain altitude, such as many fixed-wing aircraft.

The UAS 500 includes a wireless control link 510 to receive flight instructions from a ground-based system. The control link 510 can be any type of wireless communication channel, including, but not limited to, communication in an unlicensed spectrum band such as an industrial, scientific, and medical (ISM) radio band, communication in a licensed spectrum owned by the carrier deploying the UAS 500, communication in an RF band designated by the FCC for radio control activities, communication in the L-band or C-band, communication using a proprietary protocol, communication using a protocol approved by the RTCA (formerly the Radio Technical Commission for Aeronautics), or communication over a wireless network compliant with a version of IEEE 802.11 or a version of IEEE 802.16. In some embodiments, the control link 510 may be implemented as a wireless terminal of the RAN with the flight instructions sent as data over the RAN to the control link.

The UAS 500 also includes a control system 520, coupled to the wireless control link 510, to control the UAS 500 based on the flight instructions received through the wireless control link 510. In some embodiments, the wireless control link 510 receives flight instructions providing real-time control instructions to the control system 520 from a ground-based system to control the flight of the UAS 500. But in some embodiments, the flight instructions describe a hover position and the control system 520 autonomously navigates the UAS 500 to the hover position and autonomously maintains the UAS 500 in the hover position. In some embodiments, the flight instructions describe a flight path and the control system 510 autonomously navigates the UAS 500 to follow the flight path.

The UAS 500 also includes a propulsion system, coupled to and under control of the control system 520, to keep UAS 500 airborne and provide movement with at least three degrees of freedom. In the embodiment shown, the propulsion system includes the battery and motor 506, and rotors 504. Any type of propulsion system may be used, including propulsion systems using a battery, a solar cell, a chemical-based fuel, an electric motor, an internal combustion engine, a jet engine, a turbine, a propeller, a rotor, a wing, or a lighter-than-air component. Movement in up to six degrees of freedom, such as latitude, longitude, altitude, yaw, pitch and roll may be provided, although some systems may provide for movement in as few as three of those degrees of freedom. In other embodiments, three degrees of freedom may be defined for the movement, such as X, Y, and Z, or elevation, azimuth, and distance from origin.

The UAS 500 includes a wireless fronthaul link 545 to communicate with a baseband unit (BBU) of a radio access network (RAN). The fronthaul link 545 may be any type of wireless communication channel, including, but not limited to, communication in an unlicensed spectrum band such as an industrial, scientific, and medical (ISM) radio band, communication in a licensed spectrum owned by the carrier deploying the UAS 500, communication in the L-band or C-band, communication using a proprietary protocol, or communication over a wireless network compliant with a version of IEEE 802.11 or a version of IEEE 802.16. In some embodiments, the wireless control link 510 and the wireless fronthaul link 545 co-exist on a single wireless network, and in some cases the wireless control link 510 is embedded within the wireless fronthaul link 545. The single wireless network used may be a wireless network compliant with a version of IEEE 802.11 or a version of IEEE 802.16. In some embodiments, a BBU includes the ground-based system which generates the flight instructions.

A remote radio unit (RRU) is included in the UAS 500 and is coupled to the fronthaul link 545. The RRU includes electronic circuitry to perform at least a first portion of a first-level protocol of a radio access network (RAN) and generate a radio frequency signal for communicating with a mobile terminal compatible with the RAN. The RRU facilitates communication between a BBU of the RAN and the mobile terminal. An antenna 511 is also included in the UAS 500. The antenna 511 is coupled to the wireless control link, the wireless fronthaul link, and the electronic circuitry of the RRU 530. In some embodiments, an antenna 511 is shared by the three wireless transceivers, but in other embodiments, multiple antennas 511 are used due to the different wireless transceivers using different radio frequencies.

Figure 6:
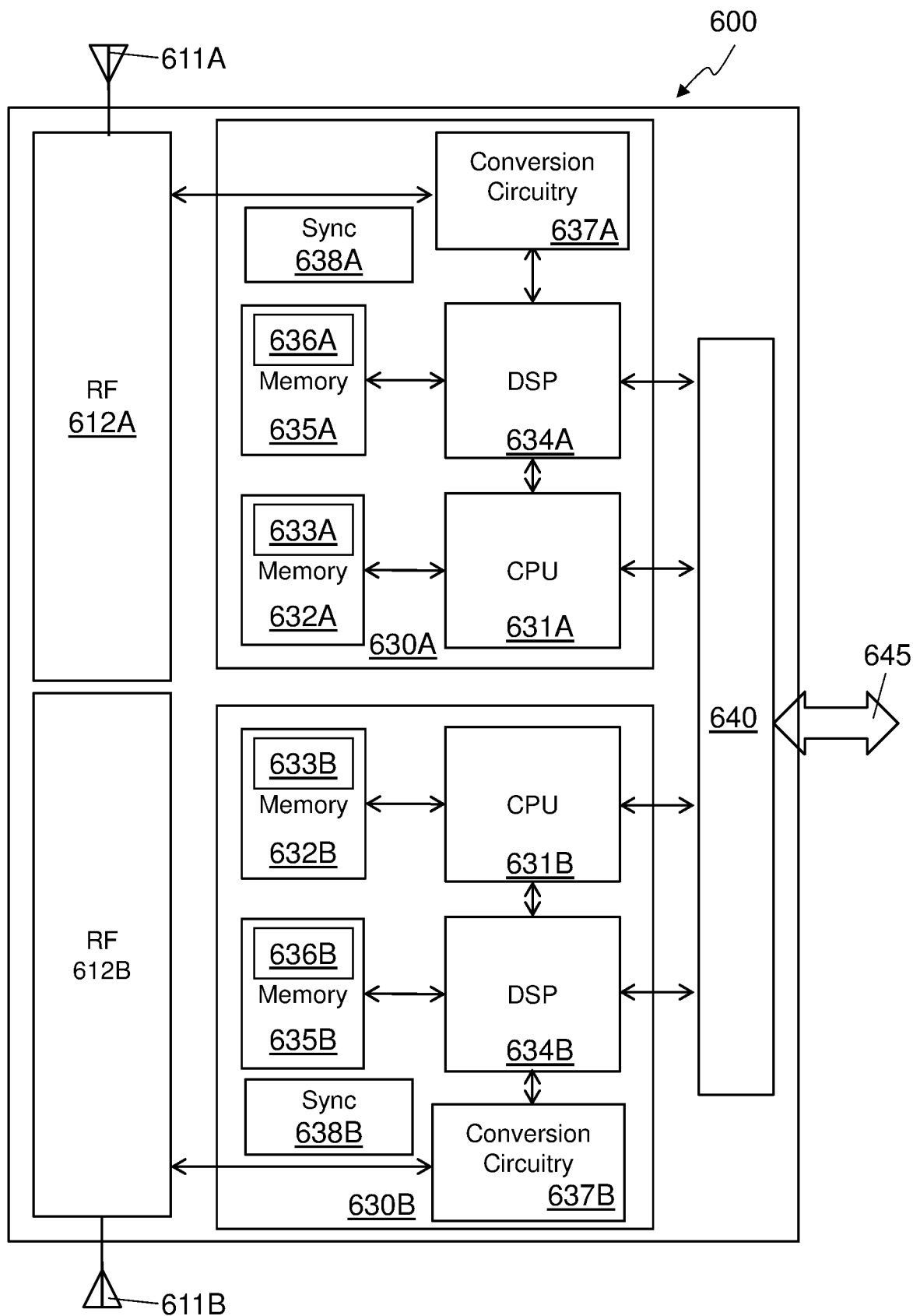
FIG. 6 is a block diagram of an embodiment a compound RRU.

The UAS 500 may be included as a RRU in the RAN system shown in FIG. 2, 3 or 4, where the RRU 530 is a RRU of a cluster of RRUs. The electronic circuitry of the BBU of the RAN may send commands to the UAS 500 to dynamically position the cluster of RRUs based on the one or more parameters. In some embodiments, the RRU 530 may be a compound RRU as shown in FIG. 6, with two or more logical RRUs that share the fronthaul link 545. The UAS 500 with a compound RRU may communicate with multiple BBUs of the RAN.

A compound RRU may be associated with multiple BBU instances that are associated with multiple carriers. The various logical RRUs of the compound RRU may have independent transceivers that can be tuned on different frequencies. The transceivers of the logical RRUs may be partitioned into groups, and each group may be controlled by a different BBU instance. Each BBU instance may have full control of the group, including sending configuration commands to carriers in the group, data transfers in both directions, and the like. The compound RRU may be a neutral-host device shared among multiple mobile network operators, with each mobile network operator able to control, via a BBU instance, a group of carriers within the RRU.

FIG. 6 is a block diagram of compound RRU (CRRU) 600. The CRRU 600 may be used with a plurality of baseband units (BBUs) in a distributed radio access network (RAN), although in some cases, more than one logical RRU of the CRRU 600 may be assigned to a single BBU. The CRRU 600 includes a single interface circuit 640 coupled to a fronthaul link 645 and adapted to communicate over the fronthaul link 645 using an adaptive fronthaul protocol. The fronthaul link 645 may be any sort of communication link, depending on the embodiment, but in at least some embodiments, the fronthaul link 645 is a network compatible with an IEEE 802 standard and the single interface circuit 640 includes only a single media access controller (MAC) address for use on the fronthaul link 645. The CRRU 600 also includes radio frequency (RF) circuitry 612A/B coupled to an antenna 611A/B.

A first logical RRU 630A and a second logical RRU 630B are also included in the CRRU 600. A CRRU 600 may have any number of logical RRUs, depending on the embodiment. The first logical RRU 630A is coupled to the single interface circuit 640 and the radio frequency circuitry 612A/B. The first logical RRU 630A includes first control registers to control operation of the first logical RRU 630A. The second logical RRU 630B is also coupled to the single interface circuit 640 and the radio frequency circuitry 612A/B. The second logical RRU 630B includes second control registers to control operation of the second logical RRU 630B. The first logical RRU 630A and the second logical RRU 630B appear as independent RRUs to BBUs that communicate with them over the fronthaul link 645. In some embodiments, the RF circuitry 612A/B can be shared between the two logical RRUs 630A, 630B. In other embodiments, the RF circuitry 612A/B includes a first RF circuit 612A coupled to the first logical RRU 630A and a first antenna 611A, and a second RF circuit 612B coupled to the second logical RRU 630B and a second antenna 611B.

The first logical RRU 630A includes first conversion circuitry 637A and first transformation circuitry coupled to the first control registers, and the second logical RRU 630B includes second conversion circuitry 637B and second transformation circuitry coupled to the second control registers. The first and second logical RRUs 630A/B may include identical elements as shown in FIG. 6, or may each have different designs. A logical RRU may be implemented using a variety of circuitry, including application specific integrated circuits (ASICs), discrete logic, various memories, digital signal processors (DSPs) and/or general purpose processors (CPUs). While a design using a DSP and a CPU is shown in FIG. 6, other designs are envisioned. Because the two logical RRUs 630A/B are shown with the same logical blocks, they will be discussed together and any reference number that leaves off the letter suffix can be interpreted as referring to that block in either the first logical RRU 630A or the second logical RRU 630B.

The transformation circuitry of a logical RRU 630 as shown in FIG. 6 includes a processing subsystem that may include a CPU 631 coupled a tangible computer memory 632. The tangible computer memory 632 holds instructions 633 executable by CPU 631, to perform action associated with the transformation circuitry. The CPU 631 may also execute instructions 633 to perform actions associated with the single fronthaul interface circuit 640, and other action to control the RRU 630. In some embodiments, the processing subsystem may include a DSP 634 for some of the tasks of the transformation circuitry. The DSP may be coupled to a tangible computer memory 635. The tangible computer memory 635 holds instructions 636 executable by DSP 634, to perform actions associated with the transformation circuitry, such as performing fast Fourier transform (FFT) and/or inverse fast Fourier transform (IFFT) operations. In other embodiments, the processing subsystem may include the DSP 634 and may not include the CPU 631. In such embodiments, the DSP 634 may be able to provide control functionality or the control functionality may be provided by other circuitry. In other embodiments, the processing subsystem may include the CPU 631 and not include the DSP 634. In such embodiments, the CPU 631 may be able to perform signal processing functions such as one or more of a FFT, IFFT, selection, quantization, adaptive compression, expansion, formatting, and the like. In some embodiments, dedicated circuitry may be provided for some of the signal processing functions so the CPU 631 can provide the overall control functionality. Other embodiments may have any number of processors of any type, depending on the embodiment.

The first and second control registers may be respectively implemented in the first logical RRU 630A and second logical RRU 630B in many different ways, depending on the embodiment. In at least one embodiment, the first and second control registers may be implemented as separate hardware registers within the circuitry, or as registers or memory locations within the CPU 631 or DSP 634. In other embodiments, the first and second control registers may be defined as particular memory locations within the memory 632 of the CPU 631 and/or particular memory locations within the memory 635 of the DSP 634.

The first logical RRU 630A includes a first timebase synchronization circuit 638A to synchronize the first logical RRU 630A with a first timebase of the RAN, and the second logical RRU 630B includes a second timebase synchronization circuit 638B to synchronize the second logical RRU 630B with a second timebase of the RAN, where the second timebase is not necessarily synchronized with the first timebase. The first timebase may be associated with a first BBU and the second timebase may be associated with a second BBU. The timebase synchronization circuit 638 may be controlled by respective control registers in the logical RRU 630.

So in some embodiments of the compound RRU 600, adaptive compression circuitry is included for use by the adaptive fronthaul protocol for communication over the fronthaul link 645. Such adaptive compression circuitry may also be included in a stand-alone RRU. The adaptive compression circuitry may utilize instructions 636 stored in the memory 635, executable by the DSP 634, to perform a Fourier transform to convert the digital baseband samples into frequency-domain information for a set of received tones, and a compression of the frequency-domain information by discarding information related to a tone of the set of received tones in the frequency-domain information to generate the fronthaul uplink information under control of the control circuitry. Control circuitry, which may include the DSP 634, the CPU 631, and/or other circuitry, is configured to identify the one tone based on the information received from the BBU and provide the tone to the DSP 634. In some embodiments, the instructions 636 are executable by the DSP 634 to perform a Fourier transform to convert the digital baseband samples into frequency-domain information and generate the fronthaul uplink information based on the frequency-domain information at a quantization level that is dynamically controlled by the control circuitry. The control circuitry is configured to determine the quantization level based, at least in part, on the information received from the BBU, and dynamically provide the quantization level to the DSP 634.

Aspects of various embodiments are described with reference to flowchart illustrations and/or block diagrams of methods, apparatus, systems, and computer program products according to various embodiments disclosed herein. It will be understood that various blocks of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and/or block diagrams in the figures help to illustrate the architecture, functionality, and operation of possible embodiments of systems, devices, methods, and computer program products of various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems or circuitry that perform the specified functions or acts, or combinations of special purpose hardware, circuitry, and computer instructions.

These computer program instructions, such as those used to implement any method described herein, may also be stored in a non-transitory computer-readable medium, such as a tangible computer memory, or tangible memory, that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 7:
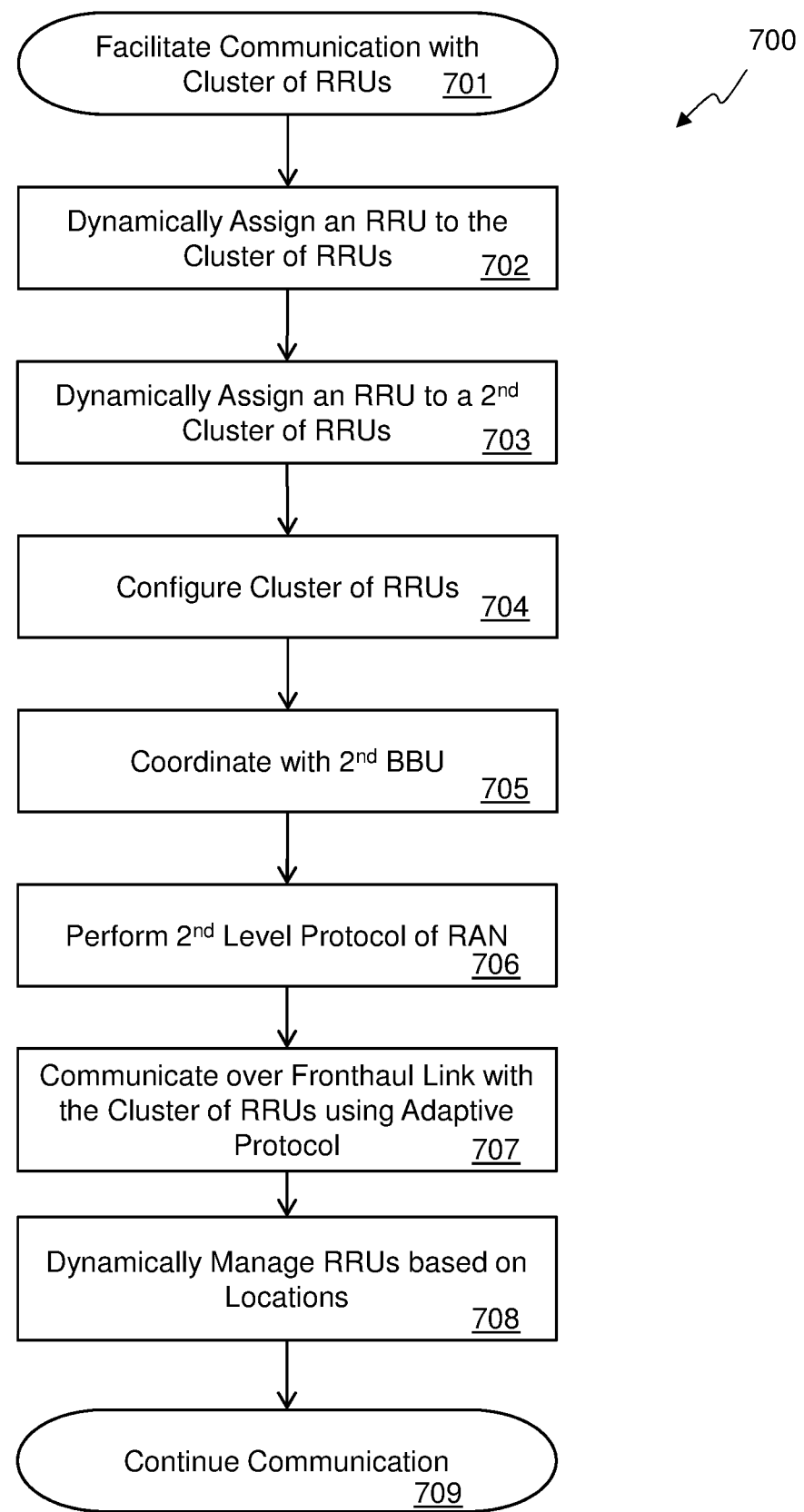
FIG. 7 shows a flowchart for an embodiment of a method of facilitating communication between a core network and a cluster of RRUs by a baseband unit (BBU) in a distributed RAN.

FIG. 7 shows a flowchart 700 for an embodiment of a method of facilitating communication 701 between a core network and a cluster of RRUs by a baseband unit (BBU) in a distributed RAN. The method includes assigning 702 one or more RRUs, selected from a group of RRUs communicably coupled to the BBU by a fronthaul link, to the cluster of RRUs based on one or more parameters. The method may further include assigning the one or more RRUs to the cluster of RRUs dynamically, based on the changing of the parameters.

The one or more parameters can include a large number of measurements, settings, or other information related to the RAN system. In some embodiments, the one or more parameters include numbers of mobile terminals in active communication with the group of RRUs, radio measurements performed by the group of RRUs, radio measurements performed by the mobile terminals, geographic locations of the group of RRUs, geographic locations of mobile terminals in active communication with the group of RRUs, or any combination thereof. In some embodiments, the one or more parameters include synchronization states of the group of RRUs. And in some embodiments, the one or more parameters include a fronthaul link quality parameter. The fronthaul link quality parameter may be determined in various ways, including determining the fronthaul link quality parameter based on information received from the group of RRUs over the fronthaul link, where the information received from the group of RRUs may include RRU buffer status information, RRU buffer overrun indications, RRU buffer underrun indications, information about a received radio frequency signal, or any combination thereof. In some embodiments, the fronthaul link quality parameter is determined based on a latency of the fronthaul link, a bandwidth of the fronthaul link, errors on the fronthaul link, undelivered packets on the fronthaul link, out-of-order packets on the fronthaul link, buffer overruns, buffer underruns, or any combination thereof.

The method may continue in some embodiments by assigning 703 one or more other RRUs of the group of RRUs to a second cluster of RRUs. This assignment may also be performed dynamically.

The BBU may also configure 704 the cluster of RRUs. The configuration can include sending many different settings to the cluster of RRUs. In some embodiments, the configuring includes setting a transmission power of the cluster of RRUs based on the one or more parameters or setting a radio frequency used by the cluster of RRUs to communicate with mobile terminals based on the one or more parameters. The BBU may configure the cluster of RRUs to appear as a single base station to a mobile terminal or it may configure a first RRU of the cluster of RRUs to transmit data that is different than data transmitted by a second RRU of the cluster of RRUs during at least some time periods. As a part of the configuring, the BBU may configure a first RRU of the cluster of RRUs to communicate with a first mobile terminal and configure a second RRU of the cluster of RRUs to communicate with a second mobile terminal based on geographic locations of, or radio measurements performed by, the first RRU, the second RRU, the first mobile terminal, and the second mobile terminal. Embodiments may also configure a first RRU of the cluster of RRUs to only transmit to a mobile terminal, and configure a second RRU of the cluster of RRUs to only receive from the mobile terminal. As a part of dynamic configuring, the BBU may also determine that a first RRU of the cluster of RRUs has failed, and hand over a mobile terminal associated with the first RRU to a second RRU of the cluster of RRUs.

In some embodiments, a BBU may determine that a predetermined capacity threshold of the BBU has been exceeded, and use this information in the configuration of the clusters of RRUs. In response to this determination, the BBU may change a parameter in the cluster of RRUs or a mobile device in communication with the cluster of RRUs. The changing of the parameter may be a part of one or more of the following:

handing over of the mobile terminal to another BBU;
reducing a throughput for the mobile terminal;
reducing a resource block allocation;
changing a modulation and coding scheme for the cluster of RRUs;
suspending unicast uplink scheduling in the cluster of RRUs for one or more scheduling intervals; or
suspending unicast downlink scheduling in the cluster of RRUs for one or more scheduling intervals.

The method may also include coordinating 705 with a second BBU. The coordination with the second BBU may take many forms. In one non-limiting example, the BBU may determine that a first RRU of the cluster of RRUs has failed, and the coordinating with the second BBU includes moving a mobile terminal associated with the first RRU to a second RRU. The second RRU in this case is associated with a second cluster of RRUs that is associated with the second BBU. In another non-limiting example, the BBU may coordinate with the second BBU by coordinating RAN parameters with the second BBU. In addition, the BBU may move a selected RRU from the cluster of RRUs to a second cluster of RRUs associated with the second BBU. Moving the selected RRU may include any combination of:

- handing over a mobile terminal associated with the selected RRU to another RRU of the cluster of RRUs;
- changing a parameter associated with the mobile terminal in the BBU;
- sending a command to the mobile terminal;
- sending a deactivation command to the selected RRU;
- informing the selected RRU that it is associated with the second BBU; or
- setting synchronization parameters in the selected RRU that are compatible with the second BBU.

Some systems where this method can be used may include a compound RRU as shown in FIG. 6. The compound RRU can include a first logical RRU and a second logical RRU that share a fronthaul link interface. The first logical RRU acts as a first RRU and the second logical RRU acts as a second RRU. In such systems the method may include assigning the first RRU of the group of RRUs to the cluster of RRUs and not assigning the second RRU of the group of RRUs to the cluster of RRUs based on the one or more parameters, where the first RRU and the second RRU are both logical RRUs of the compound RRU.

The method also includes performing 706, by the BBU, at least a second-level protocol of the RAN. In some embodiments, the BBU may also perform a portion of a first-level protocol of the RAN. Various RAN architectures and protocols may be used, but in at least one embodiment, the RAN protocol utilizes an Evolved Universal Terrestrial Radio Access Network (E-UTRAN), the core network includes an Evolved Packet Core (EPC), the first-level protocol includes an Evolved Universal Terrestrial Radio Access (E-UTRA) physical-layer (PHY) protocol, and the second-level protocol comprises an E-UTRA medium access control (MAC) protocol The method continues with communicating 707 over the fronthaul link with the cluster of RRUs. In some embodiments, the communicating over the fronthaul link with the cluster of RRUs is done using an adaptive fronthaul protocol.

In some embodiments the RRUs are dynamically managed 708 based on location. In embodiments, the one or more parameters may include geographic locations of the group of RRUs or geographic locations of mobile terminals in active communication with the group of RRUs. The geographic locations may be directly reported using information derived from a global positioning system (GPS) circuit or other location finding mechanism, or may be estimated based on radio measurements from one or more RRUs and/or mobile terminals. In some embodiments the geographic locations of the group of RRUs include a building floor, and the assigning of the one or more RRUs is based on the one or more RRUs having a common building floor location. In some embodiments, the group of RRUs are mobile and the one or more parameters further include a geographic service area of the BBU. In such embodiments the assigning of the one or more RRUs may include dynamically assigning the one or more RRUs to the cluster of RRUs based on current locations of the group of RRUs and the geographic service area of the BBU.

In some embodiments the group of RRUs are located on unmanned aircraft systems (UASs), and the method includes sending commands to the UAS to dynamically position the group of RRUs based on the one or more parameters. The dynamic positioning may be calculated to provide the widest possible coverage for the cluster of RRUs associated with the BBU, to manage a load of the BBU, to provide at least a predetermined minimum service level to the largest number of mobile terminals, or any other target. The dynamic positioning may include sending a hover location to a particular RRU of the cluster of RRUs, or a flight path to the particular RRU of the cluster of RRUs. The dynamic positioning may include sending a flight path to an unassigned RRU that is not in the cluster of RRUs and then adding the RRU to the cluster of RRUs. It may also include coordinating with a second BBU to transfer a second RRU from the second cluster to the cluster of RRUs associated with the BBU and then sending a flight path to the second RRU to position it within the cluster of RRUs. In some embodiments, various RRUs of the group of RRUs may be located on a ground-based or water-based vehicle. The method may continue 709 and may repeat any of the mentioned activities, depending on the embodiment.

Figure 8:
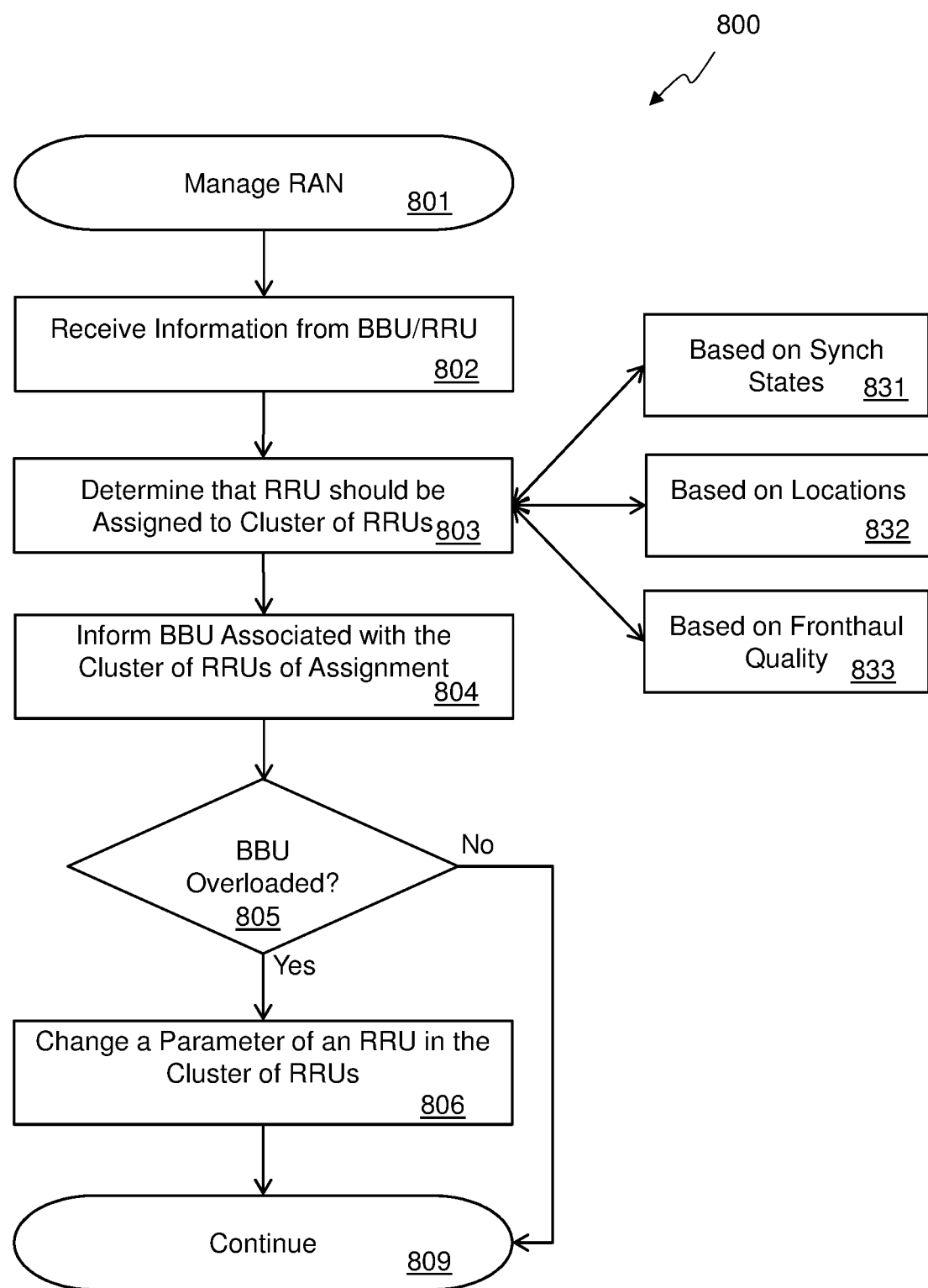
FIG. 8 shows a flowchart for an embodiment of a method for managing a distributed RAN.

FIG. 8 shows a flowchart 800 for an embodiment of a method for managing 801 a distributed RAN. The method includes receiving information 802 from a remote radio unit (RRU) or baseband unit (BBU) and determining 803, based on the information and one or more parameters, that the RRU should be assigned to a particular cluster of RRUs. The method also includes informing 804 a baseband unit (BBU) associated with the particular cluster of RRUs that the RRU has been assigned to the particular cluster of RRUs.

This method may also be used when the one or more parameters indicate that a RRU assigned to the first BBU should be moved to a second BBU to migrate the RRU from the first BBU to the second BBU. In such a method, it may be decided, based on the information received from the first BBU, that the first BBU is not functioning properly. Based on that decision, a cluster of RRUs assigned to the first BBU may be migrated to other BBUs. The migration of the RRU from the first BBU to the second BBU may include any combination of:

- handing over a mobile terminal associated with the RRU to another RRU associated with the first BBU;
- changing a parameter associated with the mobile terminal in the first BBU;
- sending a command to the mobile terminal;
- sending a deactivation command to the RRU;
- informing the RRU that is it associated with the second BBU; or
- setting synchronization parameters in the RRU compatible with the second BBU.

In some embodiments, the determining that the RRU should be migrated includes deciding, based on the information received from the first BBU and information received from another existing BBU, whether to assign the RRU to the other existing BBU, using the other existing BBU as the second BBU in response to the decision, and migrating the RRU to the other existing BBU. In some embodiments, the information received from the first BBU and information received from the other existing BBUs indicates that the RRU has physically moved to an into a service area of the other existing BBU.

In the method of the flowchart 800, the one or more parameters used to determine that a RRU should be assigned to a particular cluster of RRUs may include numbers of mobile terminals in active communication with the RRU or the first or second BBU, radio measurements performed by the RRU or the first or second BBU, radio measurements performed by the mobile terminals, or any combination thereof. In some embodiments, the one or more parameters include synchronization states 831 of the RRU or the particular cluster of RRUs or the first or second BBU.

The one or more parameters may, in some embodiments, include geographic locations 832 of the cluster of RRUs or geographic locations of mobile terminals in active communication with the cluster of RRUs. The one or more parameters may also include geographic service areas for the first BBU or the second BBU, and the information from the first BBU may include a geographic location of the RRU. In such embodiments, the method may also include dynamically assigning the RRU to the second BBU based on a movement of the RRU into the geographic service area of the second BBU. The geographic locations of the cluster of RRUs may include a building floor, and the method may further include assigning the RRU to the particular cluster of RRUs based on the RRU and the particular cluster of RRUs having a common building floor location. In some embodiments, a group of RRUs comprising the RRU and the particular cluster of RRUs are mobile and the method may further include dynamically assigning the RRU to the particular cluster of RRUs based on current locations of the RRU and the particular cluster of RRUs.

In some embodiments, the one or more parameters include a fronthaul link quality parameter 833 for a fronthaul link associated with the RRU, the particular cluster of RRUs, or the first or second BBU. The fronthaul link quality parameter may be determined based on information received from the cluster of RRUs over the fronthaul link, such as buffer status information for the first BBU or the RRU, buffer overrun indications for the first BBU or RRU, buffer underrun indications for the first BBU or the RRU, information about a received radio frequency signal, a geographic location of the for the first BBU or the RRU, or any combination thereof. In some embodiments, the fronthaul link quality parameter is determined based on a latency of the fronthaul link, a bandwidth of the fronthaul link, errors on the fronthaul link, undelivered packets on the fronthaul link, out-of-order packets on the fronthaul link, buffer overruns, buffer underruns, or any combination thereof.

Different actions may be taken depending on the current situation of the group of RRUs. In some cases the method may determine that the information received from the RRU indicates that the RRU is not currently assigned, and based on the one or more parameters, determine that the RRU should be assigned to an existing cluster of RRUs, where the existing cluster of RRUs is the particular cluster of RRUs. In other cases the method may determine that the information received from the RRU indicates that the RRU is not currently assigned, and based on the one or more parameters, determine that the RRU should be assigned to a new cluster of RRUs. To do this, the method may decide, based on the information received from the RRU and information received from an existing BBU, to assign the new cluster of RRUs to the existing BBU. Alternatively, the method may decide, based on the information received from the RRU and information received from one or more existing BBUs, to assign the new cluster of RRUs to a new BBU. To create a new BBU, the method may instantiate a new BBU on a virtual machine and assign the new BBU to be the BBU associated with the particular cluster of RRUs in response to the decision. In some cases, the method may instantiate the virtual machine as a new virtual machine in a data center before instantiating the new BBU on the virtual machine. In some cases the data center may be managed by a public cloud service, such as Amazon AWS, Google Compute Engine, or the like.

In some embodiments, the method may also include determining that the information received from the RRU indicates that the RRU is currently assigned to a first BBU that is no longer appropriate, and deciding, based on the information received from the RRU and information received from an existing BBU, to assign the RRU to a cluster of RRUs currently associated with the existing BBU, and assigning the RRU to the cluster of RRUs associated with the existing BBU. Alternatively, the method may decide, based on the information received from the RRU and information received from an existing BBU, to assign the RRU to a cluster of RRUs associated with a new BBU. The new BBU may be instantiated on an existing virtual machine or a new virtual machine may be instantiated in a data center and the new BBU instantiated on the new virtual machine.

In some cases the information received from the RRU indicates that the RRU has physically moved, which indicates that the first BBU is not appropriate for the RRU. This may be because the RRU has moved outside of a geographical service area for the first BBU or that the RRU is no longer able to communicate with the first BBU over the fronthaul link. If the RRU has moved into the service area of an existing BBU, the RRU may be moved to a cluster of RRUs associated with the existing BBU. If the RRU has moved outside of the service area of the existing BBUs, a new BBU may be instantiated.

The method shown in the flowchart 800 may continue in some embodiments by using the information received from a baseband unit (BBU) to determine that a predetermined capacity threshold of the BBU has been exceeded 805, which may also be referred to as determining that the BBU is overloaded. The method may then continue by changing a parameter in a cluster of RRUs 806 associated with the BBU or a mobile device in communication with the cluster of RRUs in response to the determination that the predetermined capacity threshold of the BBU has been exceeded. The changing of the parameter may be a part of performing one or more of:

handing over of the mobile terminal to another BBU;
    reducing a throughput for the mobile terminal;
    reducing a resource block allocation;
    changing a modulation and coding scheme for the cluster of RRUs;
    suspending unicast uplink scheduling in the cluster of RRUs for one or more scheduling intervals; or
    suspending unicast downlink scheduling in the cluster of RRUs for one or more scheduling intervals.

The method may continue 809 by repeating one or more of the elements shown in the flowchart 800.

Figure 9:
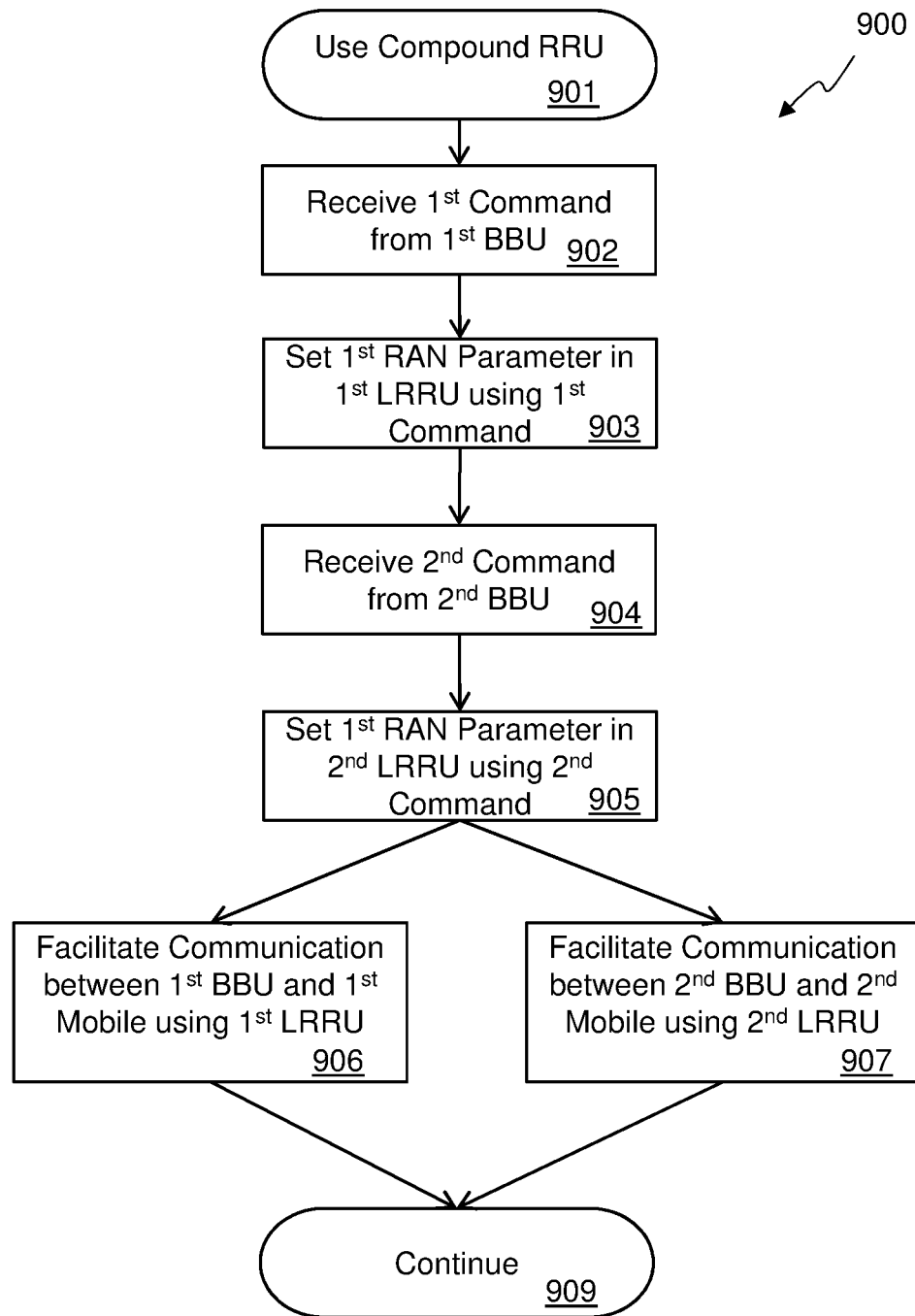
FIG. 9 shows a flowchart for an embodiment of a method of using a compound RRU.

FIG. 9 shows a flowchart 900 for an embodiment of a method of using 901 a compound RRU (CRRU) in a distributed RAN. A compound RRU, such as that shown in FIG. 6, is an apparatus that includes a single interface circuit coupled to a fronthaul link and adapted to communicate over the fronthaul link using an adaptive fronthaul protocol, and a radio frequency (RF) circuitry coupled to an antenna. The compound RRU also includes a first logical RRU and a second logical RRU, both of which are coupled to the single interface circuit and the radio frequency circuitry. The first logical RRU includes first control registers to control operation of the first logical RRU, and the second logical RRU includes second control registers to control operation of the second logical RRU.

The method includes receiving a first command 902 from a first baseband unit (BBU) over a fronthaul link through the single interface circuit of the compound RRU, and continues with using information from the first command to set a first RAN parameter 903 to a first value in the first logical RRU of the compound RRU. The method also includes receiving a second command 904 from a second baseband unit (BBU) over the fronthaul link through the single interface circuit of the compound RRU and using information from the second command 905 to set the first RAN parameter to a second value in the second logical RRU of the compound RRU. The first RAN parameter can be any parameter that impacts a functionality of the RAN, but in at least one embodiment, the first RAN parameter is a carrier frequency to be used by the logical RRU.

The method continues with facilitating communication 906 between the first BBU and a first mobile terminal through the first logical RRU, and facilitating communication 907 between the second BBU and a second mobile terminal through the second logical RRU. In some embodiments the method also includes synchronizing the first logical RRU to a first timebase of the RAN, and synchronizing the second logical RRU with a second timebase of the RAN, where the second timebase is not necessarily synchronized with the first timebase. The first timebase may be associated with a first cluster of RRUs, associated with a first BBU, that are configured to act as if they are a part of a first base station, and the second timebase may be associated with a second cluster of RRUs, associated with a second BBU, that are configured to act as if they are a part of a second base station. The method may continue 909 and may repeat any of the mentioned activities, depending on the embodiment.

Going back to a general discussion of the disclosed technology, in some embodiments opportunities for monetization of the various elements of the RaaS may exist. A RaaS BBU may be deployed on a private data center, either on-premise or remote, or on a public cloud service such as the Amazon Web Services (AWS), Google Compute Engine, or the like. When deployed on a public cloud service, a virtual machine may be used to run the BBU software, or a new service may be offered by the cloud vendor specifically for running RaaS BBU instances. When deployed on a data center, virtual machine, or the like, not owned by the customer (e.g., a public cloud), billing for the customer may be based on:

a flat daily, weekly, monthly, or yearly rate, based on a number of active BBUs, a number of active RRUs, features enabled, a standard version, bandwidth, throughput, or other performance metric, or the like;
  an actual usage of the BBU, e.g., in terms of number of BBUs and activity level, such as a processing resource usage, number of terminals, terminal activities (e.g., throughput) and time of activity, number and activity (time, load, power) of connected RRUs, features enabled, standard version, bandwidth, throughput, or other performance metric, or the like;

A RaaS can be used as a means for testing mobile terminals or the evolved packet core (EPC) of an LTE or LTE-A RAN. The testing could be a conformance test, standard compliancy assessment, performance evaluation, and the like. In such as testing architecture, a RaaS BBU may be implemented in the cloud, and the RaaS-FIP protocol may be used to connect the BBU with a RRU at the customer's premise. In an alternative embodiment, the customer may be directly using the RaaS-FIP protocol interfaced with customer's own software, without the need for a dedicated hardware RRU. In another alternative embodiment for the testing of the EPC or one of the standardized interfaces, such as a S1AP interface, X2AP interface, or the like, at least one of those protocols may be used to connect the BBU in the cloud with the customer's premise. Billing of the customer may be based on an actual usage of the BBU, a number of BBUs, features enabled, standard version, bandwidth, throughput, or other performance metric, or the like. In some embodiments, billing may a flat amount, such as on a daily, monthly, or yearly basis.

As will be appreciated by those of ordinary skill in the art, aspects of the various embodiments may be embodied as a system, device, method, or computer program product apparatus. Accordingly, elements of the present disclosure may take the form of an entirely hardware embodiment, an entirely software embodiment (including firmware, resident software, micro-code, or the like) or an embodiment combining software and hardware aspects that may all generally be referred to herein as a "server," "circuit," "module," "client," "computer," "logic," or "system." Furthermore, aspects of the various embodiments may take the form of a computer program product embodied in one or more computer-readable medium(s) having computer program code stored thereon.

Any combination of one or more computer-readable storage medium(s) may be utilized. A computer-readable storage medium may be embodied as, for example, an electronic, magnetic, optical, electromagnetic, infrared, or semiconductor system, apparatus, or device, or other like storage devices known to those of ordinary skill in the art, or any suitable combination of computer-readable storage mediums described herein. In the context of this document, a computer-readable storage medium may be any tangible medium that can contain, or store a program and/or data for use by or in connection with an instruction execution system, apparatus, or device. Even if the data in the computer-readable storage medium requires action to maintain the storage of data, such as in a traditional semiconductor-based dynamic random access memory, the data storage in a computer-readable storage medium can be said to be non-transitory. A computer data transmission medium, such as a transmission line, a coaxial cable, a radio-frequency carrier, and the like, may also be said to store data, although any data storage in a data transmission medium can be said to be transitory. Nonetheless, a computer-readable storage medium, as the term is used herein, does not include a computer data transmission medium.

Computer program code for carrying out operations for aspects of various embodiments may be written in any combination of one or more programming languages, including an object oriented programming language such as Java, Smalltalk, C++, or the like, and conventional procedural programming languages, such as the "C" programming language or similar programming languages. The computer program code if loaded onto a computer, or other programmable apparatus, produces a computer implemented method. The instructions which execute on the computer or other programmable apparatus may provide the mechanism for implementing some or all of the functions/acts specified in the flowchart and/or block diagram block or blocks. In accordance with various implementations, the program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The computer program code stored in/on (i.e. embodied therewith) the non-transitory computer-readable medium produces an article of manufacture.

The computer program code, if executed by a processor causes physical changes in the electronic devices of the processor which change the physical flow of electrons through the devices. This alters the connections between devices which changes the functionality of the circuit. For example, if two transistors in a processor are wired to perform a multiplexing operation under control of the computer program code, if a first computer instruction is executed, electrons from a first source flow through the first transistor to a destination, but if a different computer instruction is executed, electrons from the first source are blocked from reaching the destination, but electrons from a second source are allowed to flow through the second transistor to the destination. So a processor programmed to perform a task is transformed from what the processor was before being programmed to perform that task, much like a physical plumbing system with different valves can be controlled to change the physical flow of a fluid.

Examples of various embodiments are described below:

An example radio frequency communication system to facilitate communication between a plurality of mobile terminals and a core network includes a group of remote radio units (RRUs), each RRU of the group of RRUs coupled to an antenna to communicate with at least some of the plurality of mobile terminals and comprising electronic circuitry to perform at least a first portion of a first-level protocol of a radio access network (RAN) and communicate over a fronthaul link, and a baseband unit (BBU) coupled to the core network and the fronthaul link and communicably coupled to the group of RRUs over the fronthaul link, the BBU comprising electronic circuitry to assign one or more RRUs selected from the group of RRUs, to a cluster of RRUs based on one or more parameters, and to perform at least a second-level protocol of the RAN. In the example system, the fronthaul link utilizing an adaptive fronthaul protocol for communication between the BBU and the cluster of RRUs. In some example systems the BBU further configured to perform a second portion of the first-level protocol. In some example systems the RAN protocol comprises an Evolved Universal Terrestrial Radio Access Network (E-UTRAN), the core network comprising an Evolved Packet Core (EPC),the first-level protocol comprises an Evolved Universal Terrestrial Radio Access (E-UTRA) physical-layer (PHY) protocol, and the second-level protocol comprises an E-UTRA medium access control (MAC) protocol. In some example systems the fronthaul link comprises an internet protocol (IP) based network. In some example systems the fronthaul link comprises a network compatible with an IEEE 802 standard. In some example systems the fronthaul link comprises a wireless network compliant with an IEEE 802.11 or an IEEE 802.16 standard. In some example systems the electronic circuitry of the BBU further assigns one or more RRUs to the cluster of RRUs dynamically. In some example systems the electronic circuitry of the BBU further assigns one or more other RRUs of the group of RRUs to a second cluster of RRUs. In some example systems the electronic circuitry of the BBU to further set a transmission power of the cluster of RRUs based on the one or more parameters. In some example systems the electronic circuitry of the BBU to further set a radio frequency used by the cluster of RRUs to communicate with a mobile terminal of the plurality of mobile terminals based on the one or more parameters. In some example systems the electronic circuitry of the BBU further configures the cluster of RRUs to appear as a single base station to a mobile terminal of the plurality of mobile terminals. In some example systems a first RRU of the cluster of RRUs transmits data that is different than data transmitted by a second RRU of the cluster of RRUs during at least some time periods. In some example systems the electronic circuitry of the BBU further configures a first RRU of the cluster of RRUs to communicate with a first mobile terminal of the plurality of mobile terminals and configure a second RRU of the cluster of RRUs to communicate with a second mobile terminal of the plurality of mobile terminals based on geographic locations of the first RRU, the second RRU, the first mobile terminal, and the second mobile terminal. In some example systems the electronic circuitry of the BBU further configures a first RRU of the cluster of RRUs to communicate with a first mobile terminal of the plurality of mobile terminals and configure a second RRU of the cluster of RRUs to communicate with a second mobile terminal of the plurality of mobile terminals based on radio measurements performed by the cluster of RRUs, the first mobile terminal, or the second mobile terminal. In some example systems the electronic circuitry of the BBU further configures a first RRU of the cluster of RRUs to only transmit to a first mobile terminal of the plurality of mobile terminals, and configure a second RRU of the cluster of RRUs to only receive from the first mobile terminal. In some example systems, the electronic circuitry of the BBU further determines that a first RRU of the cluster of RRUs has failed, and hands over a mobile terminal of the plurality of mobile terminals associated with the first RRU to a second RRU of the cluster of RRUs. Some example systems also include a second cluster of RRUs, each RRU of the second cluster of RRUs coupled to the fronthaul link, and a second BBU, associated with the second cluster of RRUs and coupled to the fronthaul link, the second BBU comprising electronic circuitry to perform at least the second-level protocol of the RAN. In some example systems the electronic circuitry of the first BBU further coordinatea with the electronic circuitry of the second BBU. In some example systems the electronic circuitry of the BBU further determines that a first RRU of the cluster of RRUs has failed, and moves a mobile terminal of the plurality of mobile terminals associated with the first RRU to a second RRU, the second RRU associated with the second cluster of RRUs. In some example systems the electronic circuitry of the BBU further coordinates moving a selected RRU from the cluster of RRUs to the second cluster of RRUs. In some example systems the electronic circuitry of the BBU further performs any combination of handing over a mobile terminal of the plurality of mobile terminals associated with the selected RRU to another RRU of the cluster of RRUs, changing a parameter associated with the mobile terminal in the BBU, sending a command to the mobile terminal, sending a deactivation command to the selected RRU, informing the selected RRU that it is associated with the second BBU, or setting synchronization parameters in the selected RRU that are compatible with the second BBU. In some example systems the electronic circuitry of the BBU further coordinates RAN parameters with the second BBU. In some example systems the electronic circuitry of the BBU further determines that a predetermined capacity threshold of the BBU has been exceeded, and changes a parameter in the cluster of RRUs or a mobile device in communication with the cluster of RRUs in response to the determination that the predetermined capacity threshold of the BBU has been exceeded. In some example systems the electronic circuitry of the BBU further performs, at least in part by the change of the parameter, at least one of a handover of a mobile terminal of the plurality of mobile terminals to another BBU, a reduction in a throughput for the mobile terminal, a reduction in a resource block allocation, a change in a modulation and coding scheme for the cluster of RRUs, a suspension of unicast uplink scheduling in the cluster of RRUs for one or more scheduling intervals, or a suspension of unicast downlink scheduling in the cluster of RRUs for one or more scheduling intervals. Some example systems also include a compound RRU comprising a single interface circuit coupled to the fronthaul link, a first logical RRU coupled to the single interface circuit, and a second logical RRU coupled to the single interface circuit, the first logical RRU and the second logical RRU both included as RRUs in the group of RRUs. Some example systems also include a second cluster of RRUs, each RRU of the second cluster of RRUs included in the group of RRUs and coupled to the fronthaul link, and a second BBU, associated with the second cluster of RRUs and coupled to the fronthaul link, wherein the first logical RRU is included in the cluster of RRUs and the second logical RRU is included in the second cluster of RRUs. In some example systems the one or more parameters comprise synchronization states of the group of RRUs. In some example systems the one or more parameters comprise a fronthaul link quality parameter. In some example systems the one or more parameters comprise geographic locations of the group of RRUs or geographic locations of at least some of the mobile terminals of the plurality mobile terminals which are in active communication with the group of RRUs. In some example systems the geographic locations of the group of RRUs include a building floor. In some example systems the electronic circuitry of the BBU further assigns the one or more RRUs to the cluster of RRUs based on the one or more RRUs having a common building floor location with another RRU of the cluster of RRUs. In some example systems the group of RRUs are mobile and the one or more parameters further comprise a geographic service area of the BBU. In some example systems the electronic circuitry of the BBU to further dynamically assign the one or more RRUs to the cluster of RRUs based on current locations of the group of RRUs and the geographic service area of the BBU. Some example systems also include one or more unmanned aircraft systems (UAS) coupled to a RRU of the cluster of RRUs. In some example systems the electronic circuitry of the BBU further sends commands to the UAS to dynamically position the cluster of RRUs based on the one or more parameters. Any combination of elements described in this paragraph may be used in a particular embodiment.

An example baseband unit (BBU) is coupled to a core network. The example BBU is for use with a cluster of remote radio units (RRUs) in a distributed radio access network (RAN). The example BBU includes a processor to execute code comprising instructions of one or more modules, one or more memory devices, coupled to the processor, to store the code, interface circuitry coupled between the processor and a fronthaul link, an orchestration module comprising instructions to assign one or more RRUs, selected from a group of RRUs communicably coupled to the fronthaul link, to the cluster of RRUs based on one or more parameters, and a networking module comprising instructions to perform at least a second-level protocol of the RAN and communicate over the fronthaul link with the cluster of RRUs. In some example BBUs the networking module further includes instructions to communicate over the fronthaul link with the cluster of RRUs using an adaptive fronthaul protocol. In some example BBUs the networking module further includes instructions to perform a portion of a first-level protocol of the RAN. In some example BBUs the RAN protocol uses an Evolved Universal Terrestrial Radio Access Network (E-UTRAN), the core network includes an Evolved Packet Core (EPC), the first-level protocol comprises an Evolved Universal Terrestrial Radio Access (E-UTRA) physical-layer (PHY) protocol, and the second-level protocol comprises an E-UTRA medium access control (MAC) protocol. In some example BBUs the orchestration module further includes instructions to assign the one or more RRUs to the cluster of RRUs dynamically. In some example BBUs the orchestration module further includes instructions to assign one or more other RRUs of the group of RRUs to a second cluster of RRUs. In some example BBUs the orchestration module further includes instructions to set a transmission power of the cluster of RRUs based on the one or more parameters. In some example BBUs the orchestration module further includes instructions to set a radio frequency used by the cluster of RRUs to communicate with a mobile terminal based on the one or more parameters. In some example BBUs the orchestration module further includes instructions to configure the cluster of RRUs to appear as a single base station to a mobile terminal. In some example BBUs a first RRU of the cluster of RRUs transmits data that is different than data transmitted by a second RRU of the cluster of RRUs during at least some time periods. In some example BBUs the orchestration module further includes instructions to configure a first RRU of the cluster of RRUs to communicate with a first mobile terminal and configure a second RRU of the cluster of RRUs to communicate with a second mobile terminal based on geographic locations of the first RRU, the second RRU, the first mobile terminal, and the second mobile terminal. In some example BBUs the orchestration module further includes instructions to configure a first RRU of the cluster of RRUs to communicate with a first mobile terminal and configure a second RRU of the cluster of RRUs to communicate with a second mobile terminal based on radio measurements performed by the cluster of RRUs, the first mobile terminal, or the second mobile terminal. In some example BBUs the orchestration module further includes instructions to configure a first RRU of the cluster of RRUs to only transmit to a mobile terminal, and configure a second RRU of the cluster of RRUs to only receive from the mobile terminal. Some example BBUs further include determining that a first RRU of the cluster of RRUs has failed, and handing over a mobile terminal associated with the first RRU to a second RRU of the cluster of RRUs. In some example BBUs the orchestration module further includes instructions to coordinate with a second BBU includes a second orchestration module and a second networking module. In some example BBUs the orchestration module further includes instructions to determine that a first RRU of the cluster of RRUs has failed, and move a mobile terminal associated with the first RRU to a second RRU, the second RRU associated with a second cluster of RRUs that is associated with the second BBU. In some example BBUs the orchestration module further includes instructions to coordinate moving a selected RRU from the cluster of RRUs to a second cluster of RRUs associated with the second BBU. In some example BBUs the orchestration module further includes instructions to perform any combination of handing over a mobile terminal associated with the selected RRU to another RRU of the cluster of RRUs, changing a parameter associated with the mobile terminal in the BBU, sending a command to the mobile terminal, sending a deactivation command to the selected RRU, informing the selected RRU that it is associated with the second BBU, or setting synchronization parameters in the selected RRU that are compatible with the second BBU. In some example BBUs the orchestration module further includes instructions to coordinate RAN parameters with the second BBU. In some example BBUs the orchestration module further includes instructions to determine that a predetermined capacity threshold of the BBU has been exceeded, and change a parameter in the cluster of RRUs or a mobile device in communication with the cluster of RRUs in response to the determination that the predetermined capacity threshold of the BBU has been exceeded. In some example BBUs the orchestration module further includes instructions to perform, at least in part by the change of the parameter, at least one of a handover of a mobile terminal to another BBU, a reduction in a throughput for the mobile terminal, a reduction in a resource block allocation, a change in a modulation and coding scheme for the cluster of RRUs, a suspension of unicast uplink scheduling in the cluster of RRUs for one or more scheduling intervals, or a suspension of unicast downlink scheduling in the cluster of RRUs for one or more scheduling intervals. In some example BBUs the one or more parameters comprise numbers of mobile terminals in active communication with the group of RRUs, radio measurements performed by the group of RRUs, radio measurements performed by the mobile terminals, or any combination thereof. In some example BBUs the one or more parameters comprise synchronization states of the group of RRUs. In some example BBUs the one or more parameters comprise a fronthaul link quality parameter. In some example BBUs the fronthaul link quality parameter is determined based on information received from the group of RRUs over the fronthaul link. In some example BBUs the information received from the group of RRUs comprises RRU buffer status information, RRU buffer overrun indications, RRU buffer underrun indications, information about a received radio frequency signal, or any combination thereof. In some example BBUs the fronthaul link quality parameter is determined based on a latency of the fronthaul link, a bandwidth of the fronthaul link, errors on the fronthaul link, undelivered packets on the fronthaul link, out-of-order packets on the fronthaul link, buffer overruns, buffer underruns, or any combination thereof. In some example BBUs the one or more parameters comprise geographic locations of the group of RRUs or geographic locations of mobile terminals in active communication with the group of RRUs. In some example BBUs the geographic locations of the group of RRUs include a building floor, the orchestration module further includes instructions to assign the one or more RRUs to the cluster of RRUs based on the one or more RRUs having a common building floor location. In some example BBUs the group of RRUs are mobile and the one or more parameters further comprise a geographic service area of the BBU. In some example BBUs the orchestration module further includes instructions to dynamically assign the one or more RRUs to the cluster of RRUs based on current locations of the group of RRUs and the geographic service area of the BBU. In some example BBUs the group of RRUs are located on unmanned aircraft systems (UAS). In some example BBUs the orchestration module further includes instructions to send commands to the UAS to dynamically position the group of RRUs based on the one or more parameters. Any combination of elements described in this paragraph may be used in a particular embodiment.

An example unmanned aircraft system (UAS) includes a wireless control link to receive flight instructions from a ground-based system, a control system, coupled to the wireless control link, to control the UAS based on the flight instructions received through the wireless control link, a propulsion system, coupled to and under control of the control system, to keep UAS airborne and provide movement with at least three degrees of freedom, a wireless fronthaul link to communicate with a baseband unit (BBU) of a radio access network (RAN), a remote radio unit (RRU) coupled to the fronthaul link, the RRU comprising electronic circuitry to perform at least a first portion of a first-level protocol of a radio access network (RAN) and generate a radio frequency signal for communicating with a mobile terminal compatible with the RAN, and an antenna, coupled to the wireless control link, the wireless fronthaul link, and the electronic circuitry of the RRU. In some example UASs the wireless control link and the wireless fronthaul link co-exist on a single wireless network. In some example UASs the single wireless network comprises a wireless network compliant with a version of IEEE 802.11 or a version of IEEE 802.16. In some example UASs the wireless control link is embedded within the wireless fronthaul link, and a BBU comprises the ground-based system which generates the flight instructions. In some example UASs the flight instructions describe a hover position, and the control system autonomously navigates the UAS to the hover position and autonomously maintains the UAS in the hover position. In some example UASs the flight instructions describe a flight path and the control system autonomously navigates the UAS to follow the flight path. Any combination of elements described in this paragraph may be used in a particular embodiment.

An example method, performed by a baseband unit (BBU), facilitates communication between a core network and a cluster of remote radio units (RRUs) in a distributed radio access network (RAN) The example method includes assigning one or more RRUs, selected from a group of RRUs communicably coupled to the BBU by a fronthaul link, to the cluster of RRUs based on one or more parameters, performing at least a second-level protocol of the RAN, and communicating over the fronthaul link with the cluster of RRUs. In some example methods the communicating over the fronthaul link with the cluster of RRUs is done using an adaptive fronthaul protocol. Some example methods also include performing a portion of a first-level protocol of the RAN. In some example methods the RAN protocol comprises an Evolved Universal Terrestrial Radio Access Network (E-UTRAN), and the core network comprises an Evolved Packet Core (EPC), the first-level protocol comprises an Evolved Universal Terrestrial Radio Access (E-UTRA) physical-layer (PHY) protocol, and the second-level protocol comprises an E-UTRA medium access control (MAC) protocol. Some example methods also include assigning the one or more RRUs to the cluster of RRUs dynamically. Some example methods also include assigning another RRU of the group of RRUs to a second cluster of RRUs. Some example methods also include setting a transmission power of the cluster of RRUs based on the one or more parameters. Some example methods also include setting a radio frequency used by the cluster of RRUs to communicate with a mobile terminal based on the one or more parameters.

Some example methods also include configuring the cluster of RRUs to appear as a single base station to a mobile terminal. Some example methods also include configuring a first RRU of the cluster of RRUs to transmit data that is different than data transmitted by a second RRU of the cluster of RRUs during at least some time periods. Some example methods also include configuring a first RRU of the cluster of RRUs to communicate with a first mobile terminal and configuring a second RRU of the cluster of RRUs to communicate with a second mobile terminal based on geographic locations of the first RRU, the second RRU, the first mobile terminal, and the second mobile terminal. Some example methods also include configuring a first RRU of the cluster of RRUs to communicate with a first mobile terminal and configuring a second RRU of the cluster of RRUs to communicate with a second mobile terminal based on radio measurements performed by the cluster of RRUs, the first mobile terminal, or the second mobile terminal. Some example methods also include configuring a first RRU of the cluster of RRUs to only transmit to a mobile terminal, and configuring a second RRU of the cluster of RRUs to only receive from the mobile terminal. Some example methods also include determining that a first RRU of the cluster of RRUs has failed, and handing over a mobile terminal associated with the first RRU to a second RRU of the cluster of RRUs. Some example methods also include coordinating with a second BBU. Some example methods also include determining that a first RRU of the cluster of RRUs has failed. In some example methods the coordinating with the second BBU comprises moving a mobile terminal associated with the first RRU to a second RRU, the second RRU associated with a second cluster of RRUs that is associated with the second BBU. In some example methods the coordinating with the second BBU comprises moving a selected RRU from the cluster of RRUs to a second cluster of RRUs associated with the second BBU. In some example methods the moving the selected RRU comprises any combination of handing over a mobile terminal associated with the selected RRU to another RRU of the cluster of RRUs, changing a parameter associated with the mobile terminal in the BBU, sending a command to the mobile terminal, sending a deactivation command to the selected RRU, informing the selected RRU that it is associated with the second BBU, or setting synchronization parameters in the selected RRU that are compatible with the second BBU. In some example methods the coordinating with the second BBU comprises coordinating RAN parameters with the second BBU. Some example methods also include determining that a predetermined capacity threshold of the BBU has been exceeded, and changing a parameter in the cluster of RRUs or a mobile device in communication with the cluster of RRUs in response to the determination that the predetermined capacity threshold of the BBU has been exceeded. Some example methods also include performing, at least in part by the changing of the parameter, at least one of handing over of a mobile terminal to another BBU, reducing a throughput for the mobile terminal, reducing a resource block allocation, changing a modulation and coding scheme for the cluster of RRUs, suspending unicast uplink scheduling in the cluster of RRUs for one or more scheduling intervals, or suspending unicast downlink scheduling in the cluster of RRUs for one or more scheduling intervals. In some example methods the one or more parameters comprise numbers of mobile terminals in active communication with the group of RRUs, radio measurements performed by the group of RRUs, radio measurements performed by the mobile terminals, or any combination thereof. In some example methods the one or more parameters comprise synchronization states of the group of RRUs. In some example methods the one or more parameters comprise a fronthaul link quality parameter. Some example methods also include determining the fronthaul link quality parameter based on information received from the group of RRUs over the fronthaul link. In some example methods the information received from the group of RRUs comprises RRU buffer status information, RRU buffer overrun indications, RRU buffer underrun indications, information about a received radio frequency signal, or any combination thereof. Some example methods also include determining the fronthaul link quality parameter based on a latency of the fronthaul link, a bandwidth of the fronthaul link, errors on the fronthaul link, undelivered packets on the fronthaul link, out-of-order packets on the fronthaul link, buffer overruns, buffer underruns, or any combination thereof. Some example methods also include assigning a first RRU of the group of RRUs to the cluster of RRUs and not assigning a second RRU of the group of RRUs to the cluster of RRUs based on the one or more parameters, wherein the first RRU and the second RRU are both logical RRUs of a compound RRU. In some example methods the one or more parameters comprise geographic locations of the group of RRUs or geographic locations of mobile terminals in active communication with the group of RRUs. In some example methods geographic locations of the group of RRUs include a building floor, and the assigning of the one or more RRUs is based on the one or more RRUs having a common building floor location with another RRU of the cluster of RRUs. In some example methods the group of RRUs are mobile and the one or more parameters further comprise a geographic service area of the BBU, and the assigning of the one or more RRUs further comprises dynamically assigning the one or more RRUs to the cluster of RRUs based on current locations of the group of RRUs and the geographic service area of the BBU. In some example methods the group of RRUs are located on unmanned aircraft systems (UAS). Some example methods also include sending commands to the UAS to dynamically position the group of RRUs based on the one or more parameters. Any combination of elements described in this paragraph may be used in a particular embodiment.

An example tangible machine readable medium includes one or more instructions that in response to being executed on a computing device cause the computing device to carry out any method described in the previous paragraph.

An example method manages a distributed radio access network (RAN). The example method includes receiving information from a remote radio unit (RRU), determining, based on the information and one or more parameters, that the RRU should be assigned to a particular cluster of RRUs, and informing a baseband unit (BBU) associated with the particular cluster of RRUs that the RRU has been assigned to the particular cluster of RRUs. In some example methods the one or more parameters comprise numbers of mobile terminals in active communication with the RRU or the particular cluster of RRUs, radio measurements performed by the RRU or the particular cluster of RRUs, radio measurements performed by the mobile terminals, or any combination thereof. In some example methods the one or more parameters comprise synchronization states of the RRU or the particular cluster of RRUs. In some example methods the one or more parameters comprise a fronthaul link quality parameter for a fronthaul link associated with the RRU or the particular cluster of RRUs. Some example methods also include determining the fronthaul link quality parameter based on information received from the cluster of RRUs over the fronthaul link. In some example methods the one or more parameters comprise geographic locations of the cluster of RRUs or geographic locations of mobile terminals in active communication with the cluster of RRUs. In some example methods the geographic locations of the cluster of RRUs include a building floor. Some example methods also include assigning the RRU to the particular cluster of RRUs based on the RRU and the particular cluster of RRUs having a common building floor location. In some example methods a group of RRUs comprising the RRU and the particular cluster of RRUs are mobile. Some example methods also include dynamically assigning the RRU to the particular cluster of RRUs based on current locations of the RRU and the particular cluster of RRUs. Some example methods also include determining that the information received from the RRU indicates that the RRU is not currently assigned, and determining, based on the one or more parameters, that the RRU should be assigned to an existing cluster of RRUs, wherein the existing cluster of RRUs is the particular cluster of RRUs. Some example methods also include determining that the information received from the RRU indicates that the RRU is not currently assigned, and determining, based on the one or more parameters, that the RRU should be assigned to a new cluster of RRUs, wherein the new cluster of RRUs is the particular cluster of RRUs. Some example methods also include deciding, based on the information received from the RRU and information received from an existing BBU, whether to assign the new cluster of RRUs to the existing BBU, and assigning the existing BBU to be the BBU associated with the particular cluster of RRUs in response to the decision. Some example methods also include deciding, based on the information received from the RRU and information received from one or more existing BBUs, whether to assign the new cluster of RRUs to a new BBU, instantiating a new BBU on a virtual machine, and assigning the new BBU to be the BBU associated with the particular cluster of RRUs in response to the decision. Some example methods also include instantiating the virtual machine as a new virtual machine in a data center. In some example methods the data center comprises a public cloud service. Some example methods also include determining that the information received from the RRU indicates that the RRU is currently assigned to a first BBU that is no longer appropriate, deciding, based on the information received from the RRU and information received from an existing BBU, whether to assign the RRU to a cluster of RRUs currently associated with the existing BBU, and defining the particular cluster of RRUs to be the cluster of RRUs currently associated with the existing BBU in response to the decision, defining the particular cluster of RRUs the information received from the RRU indicates that the RRU has physically moved. Some example methods also include determining that the information received from the RRU indicates that the RRU is currently assigned to a first BBU that is no longer appropriate, deciding, based on the information received from the RRU and information received from one or more existing BBUs, whether to assign the RRU to a cluster of RRUs associated with a new BBU, and instantiating the new BBU on a virtual machine, the new BBU associated with the particular cluster of RRUs, in response to the decision. Some example methods also include instantiating the virtual machine as a new virtual machine in a data center. In some example methods the data center comprises a public cloud service. In some example methods the information received from the RRU indicates that the RRU has physically moved. Any combination of elements described in this paragraph may be used in a particular embodiment.

An example tangible machine readable medium includes one or more instructions that in response to being executed on a computing device cause the computing device to carry out any method described in the previous paragraph.

An example method manages a distributed radio access network (RAN). The example method includes receiving information from a baseband unit (BBU), determining that a predetermined capacity threshold of the BBU has been exceeded, and changing a parameter in a cluster of RRUs associated with the BBU or a mobile device in communication with the cluster of RRUs in response to the determination that the predetermined capacity threshold of the BBU has been exceeded. Some example methods also include performing, at least in part by the changing of the parameter, at least one of handing over of a mobile terminal to another BBU, reducing a throughput for the mobile terminal, reducing a resource block allocation, changing a modulation and coding scheme for the cluster of RRUs, suspending unicast uplink scheduling in the cluster of RRUs for one or more scheduling intervals, or suspending unicast downlink scheduling in the cluster of RRUs for one or more scheduling intervals. Any combination of elements described in this paragraph may be used in a particular embodiment.

An example tangible machine readable medium includes one or more instructions that in response to being executed on a computing device cause the computing device to carry out any method described in the previous paragraph.

An example method manages a distributed radio access network (RAN). The example method includes receiving information from a first baseband unit (BBU), determining, based the information received and one or more parameters, that a remote radio unit (RRU) assigned to the first BBU should be moved to a second BBU, and migrating the RRU from the first BBU to the second BBU. Some example methods also include deciding, based on the information received from the first BBU, that the first BBU is not functioning properly, and migrating a cluster of RRUs assigned to the first BBU to other BBUs. In some example methods the one or more parameters comprise numbers of mobile terminals in active communication with the RRU or the first or second BBU, radio measurements performed by the RRU or the first or second BBU, radio measurements performed by the mobile terminals, or any combination thereof. In some example methods the one or more parameters comprise synchronization states of the RRU or the first or second BBU. In some example methods the one or more parameters comprise a fronthaul link quality parameter for a fronthaul link associated with the first or second BBU. Some example methods also include determining the fronthaul link quality parameter based on information received from the first or second BBU. In some example methods the information received from the first BBU comprises buffer status information for the first BBU or the RRU, buffer overrun indications for the first BBU or RRU, buffer underrun indications for the first BBU or the RRU, information about a received radio frequency signal, a geographic location of the for the first BBU or the RRU, or any combination thereof. Some example methods also include determining the fronthaul link quality parameter based on a latency of the fronthaul link, a bandwidth of the fronthaul link, errors on the fronthaul link, undelivered packets on the fronthaul link, out-of-order packets on the fronthaul link, buffer overruns, buffer underruns, or any combination thereof. In some example methods the one or more parameters comprise geographic service areas for the first BBU or the second BBU, and the information from the first BBU includes a geographic location of the RRU. Some example methods also include dynamically assigning the RRU to the second BBU based on a movement of the RRU into the geographic service area of the second BBU. In some example methods the migrating the RRU from the first BBU to the second BBU comprising any combination of handing over a mobile terminal associated with the RRU to another RRU associated with the first BBU, change a parameter associated with the mobile terminal in the first BBU, send a command to the mobile terminal, send a deactivation command to the RRU, inform the RRU that is it associated with the second BBU, or set synchronization parameters in the RRU compatible with the second BBU. In some example methods the determining includes deciding, based on the information received from the first BBU and information received from another existing BBU, whether to assign the RRU to the other existing BBU, and using the other existing BBU as the second BBU in response to the decision. In some example methods the information received from the first BBU and information received from the other existing BBUs indicates that the RRU has physically moved into a service area of the other existing BBU. Some example methods also include deciding, based on the information received from the first BBU and information received from one or more other existing BBUs, whether to assign the RRU to a new BBU, instantiating the new BBU on a virtual machine, and using the new BBU as the second BBU in response to the decision. Some example methods also include instantiating the virtual machine as a new virtual machine in a data center. In some example methods the data center comprises a public cloud service. In some example methods the information received from the first BBU and information received from one or more other existing BBUs indicates that the RRU has physically moved to an area outside of a service area of the first BBU and the one or more other existing BBUs. Any combination of elements described in this paragraph may be used in a particular embodiment.

An example tangible machine readable medium includes one or more instructions that in response to being executed on a computing device cause the computing device to carry out any method described in the previous paragraph.

An example compound remote radio unit (RRU) can be used with a plurality of baseband units (BBUs) in a distributed radio access network (RAN). The example compound RRU includes a single interface circuit coupled to a fronthaul link and adapted to communicate over the fronthaul link using an adaptive fronthaul protocol, radio frequency (RF) circuitry coupled to an antenna, a first logical RRU coupled to the single interface circuit and the radio frequency circuitry, the first logical RRU comprising first control registers to control operation of the first logical RRU, and a second logical RRU coupled to the single interface circuit and the radio frequency circuitry, the second logical RRU comprising second control registers to control operation of the second logical RRU. In some example compound RRUs the RF circuitry comprising a first RF circuit coupled to the first logical RRU and a first antenna, and a second RF circuit coupled to the second logical RRU and a second antenna, the first logical RRU comprising first conversion circuitry and first transformation circuitry coupled to the first control registers, and the second logical RRU comprising second conversion circuitry and second transformation circuitry coupled to the second control registers. In some example compound RRUs the single interface circuit comprising a single media access controller (MAC) address and an interface to a network compatible with an IEEE 802 standard. In some example compound RRUs the first logical RRU comprising a first timebase synchronization circuit to synchronize the first logical RRU with a first timebase of the RAN, and the second logical RRU comprising a second timebase synchronization circuit to synchronize the second logical RRU with a second timebase of the RAN, wherein the second timebase is not synchronized with the first timebase. Any combination of elements described in this paragraph may be used in a particular embodiment.

An example method of using a compound remote radio unit (RRU) in a distributed radio access network (RAN) includes receiving a first command from a first baseband unit (BBU) over a fronthaul link through a single interface circuit of the compound RRU, using information from the first command to set a first RAN parameter to a first value in a first logical RRU of the compound RRU, receiving a second command from a second baseband unit (BBU) over the fronthaul link through the single interface circuit of the compound RRU, using information from the second command to set the first RAN parameter to a second value in a second logical RRU of the compound RRU. In some example methods the first RAN parameter is a carrier frequency. Some example methods also include synchronizing the first logical RRU to a first timebase of the RAN, and synchronizing the second logical RRU with a second timebase of the RAN, wherein the second timebase is not synchronized with the first timebase. Some example methods also include facilitating communication between the first BBU and a first mobile terminal through the first logical RRU, and facilitating communication between the second BBU and a second mobile terminal through the first logical RRU. Any combination of elements described in this paragraph may be used in a particular embodiment.

An example tangible machine readable medium includes one or more instructions that in response to being executed on a computing device cause the computing device to carry out any method described in the previous paragraph.

As used in this specification and the appended claims, the singular forms "a", "an", and "the" include plural referents unless the content clearly dictates otherwise. Thus, for example, reference to an element described as "a processor" may refer to a single processor, two processors, or any other number of processors but a reference to "a single processor" refers to only one processor. As used in this specification and the appended claims, the term "or" is generally employed in its sense including both a union operator (OR) and an intersection operator (AND), which may also be referred to as an "inclusive OR" or an "and/or" unless the content clearly dictates otherwise. As used in this specification and the appended claims, the term "coupled" includes direct and indirect connections. Moreover, where first and second devices are coupled, intervening devices, including active devices, may be located there between. As used in this specification and the appended claims, the phrase "based on" should be interpreted as being open ended, equivalent to "based, at least in part, on" and allow for the action to be based on other elements in addition to the elements specified. Unless otherwise indicated, all numbers expressing quantities of elements, percentages, and so forth used in the specification and claims are to be understood as being modified in all instances by the term "about." Interpretation of the term "about" is context specific, but in the absence of other indications, should generally be interpreted as ±10% of the modified quantity, measurement, or distance. The recitation of numerical ranges by endpoints includes all numbers subsumed within that range (e.g. 1 to 5 includes 1, 2.78, 3.33, and 5). Any element in a claim that does not explicitly state "means for" performing a specified function, or "step for" performing a specified function, is not to be interpreted as a "means" or "step" clause as specified in 35 U.S.C. § 112(f).

The description of the various embodiments provided above is illustrative in nature and is not intended to limit this disclosure, its application, or uses. Thus, different variations beyond those described herein are intended to be within the scope of embodiments. Such variations are not to be regarded as a departure from the intended scope of this disclosure. As such, the breadth and scope of the present disclosure should not be limited by the above-described exemplary embodiments, but should be defined only in accordance with the following claims and equivalents thereof.

What is claimed is:

1. A radio frequency communication system to facilitate communication between a plurality of mobile terminals and a core network, the system comprising:
    a group of remote radio units (RRUs), each RRU of the group of RRUs coupled to an antenna to communicate with at least some of the plurality of mobile terminals and comprising electronic circuitry to perform at least a first portion of a physical-layer (PHY) protocol of a radio access network (RAN) and communicate over a fronthaul link; and
    a baseband unit (BBU) coupled to the core network and the fronthaul link and communicably coupled to the group of RRUs over the fronthaul link, the BBU comprising electronic circuitry to assign one or more RRUs, selected from the group of RRUs, to a cluster of RRUs based on one or more parameters, and to perform at least a medium access control (MAC) protocol of the RAN;
    the fronthaul link utilizing an adaptive fronthaul protocol for communication between the BBU and the cluster of RRUs.

2. The system of claim 1, the BBU further configured to perform a second portion of the PHY protocol.

3. The system of claim 2, wherein the RAN protocol comprises an Evolved Universal Terrestrial Radio Access Network (E-UTRAN),
    the core network comprising an Evolved Packet Core (EPC);
    the PHY protocol comprises a first protocol layer of an Evolved Universal Terrestrial Radio Access (E-UTRA) system; and
    the MAC protocol comprises a second protocol layer of the E-UTRA system.

4. The system of claim 1, wherein the fronthaul link comprises an internet protocol (IP) based network.

5. The system of claim 1, wherein the fronthaul link comprises a network compatible with an IEEE 802 standard.

6. The system of claim 1, wherein the fronthaul link comprises a wireless network compliant with an IEEE 802.11 or an IEEE 802.16 standard.

7. The system of claim 1, the electronic circuitry of the BBU to further assign the one or more RRUs to the cluster of RRUs dynamically.

8. The system of claim 1, the electronic circuitry of the BBU to further assign one or more other RRUs of the group of RRUs to a second cluster of RRUs.

9. The system of claim 1, the electronic circuitry of the BBU to further set a transmission power of the cluster of RRUs based on the one or more parameters.

10. The system of claim 1, the electronic circuitry of the BBU to further set a radio frequency used by the cluster of RRUs to communicate with a mobile terminal of the plurality of mobile terminals based on the one or more parameters.

11. The system of claim 1, the electronic circuitry of the BBU further configures the cluster of RRUs to appear as a single base station to a mobile terminal of the plurality of mobile terminals.

12. The system of claim 11, wherein a first RRU of the cluster of RRUs transmits data that is different than data transmitted by a second RRU of the cluster of RRUs during at least some time periods.

13. The system of claim 1, the electronic circuitry of the BBU further configures a first RRU of the cluster of RRUs to communicate with a first mobile terminal of the plurality of mobile terminals and configure a second RRU of the cluster of RRUs to communicate with a second mobile terminal of the plurality of mobile terminals based on geographic locations of the first RRU, the second RRU, the first mobile terminal, and the second mobile terminal.

14. The system of claim 1, the electronic circuitry of the BBU further configures a first RRU of the cluster of RRUs to communicate with a first mobile terminal of the plurality of mobile terminals and configure a second RRU of the cluster of RRUs to communicate with a second mobile terminal of the plurality of mobile terminals based on radio measurements performed by the cluster of RRUs, the first mobile terminal, or the second mobile terminal.

15. The system of claim 1, the electronic circuitry of the BBU further configures a first RRU of the cluster of RRUs to only transmit to a first mobile terminal of the plurality of mobile terminals, and configure a second RRU of the cluster of RRUs to only receive from the first mobile terminal.

16. The system of claim 1, the electronic circuitry of the BBU to further determine that a first RRU of the cluster of RRUs has failed; and
    hand over a mobile terminal of the plurality of mobile terminals associated with the first RRU to a second RRU of the cluster of RRUs.

17. The system of claim 1, further comprising:
    a second cluster of RRUs, each RRU of the second cluster of RRUs coupled to the fronthaul link; and
    a second BBU, associated with the second cluster of RRUs and coupled to the fronthaul link, the second BBU comprising electronic circuitry to perform at least the MAC protocol of the RAN;
    the electronic circuitry of the first BBU to further coordinate with the electronic circuitry of the second BBU.

18. The system of claim 17, the electronic circuitry of the BBU to further determine that a first RRU of the cluster of RRUs has failed; and
    move a mobile terminal of the plurality of mobile terminals associated with the first RRU to a second RRU, the second RRU associated with the second cluster of RRUs.

19. The system of claim 17, the electronic circuitry of the BBU to further coordinate moving a selected RRU from the cluster of RRUs to the second cluster of RRUs.

20. The system of claim 19, the electronic circuitry of the BBU to further perform any combination of:
    (a) hand over a mobile terminal of the plurality of mobile terminals associated with the selected RRU to another RRU of the cluster of RRUs;

(b) change a parameter associated with the mobile terminal in the BBU;
(c) send a command to the mobile terminal;
(d) send a deactivation command to the selected RRU;
(e) inform the selected RRU that it is associated with the second BBU; or
(f) set synchronization parameters in the selected RRU that are compatible with the second BBU.

21. The system of claim 17, the electronic circuitry of the BBU to further coordinate RAN parameters with the second BBU.

22. The system of claim 1, the electronic circuitry of the BBU to further determine that a predetermined capacity threshold of the BBU has been exceeded; and
change a parameter in the cluster of RRUs or a mobile device in communication with the cluster of RRUs in response to the determination that the predetermined capacity threshold of the BBU has been exceeded.

23. The system of claim 22, the electronic circuitry of the BBU to further perform, at least in part by the change of the parameter, at least one of:
(a) a handover of a mobile terminal of the plurality of mobile terminals to another BBU;
(b) a reduction in a throughput for the mobile terminal;
(c) a reduction in a resource block allocation;
(d) a change in a modulation and coding scheme for the cluster of RRUs;
(e) a suspension of unicast uplink scheduling in the cluster of RRUs for one or more scheduling intervals; or
(f) a suspension of unicast downlink scheduling in the cluster of RRUs for one or more scheduling intervals.

24. The system of claim 1, further comprising a compound RRU comprising a single interface circuit coupled to the fronthaul link, a first logical RRU coupled to the single interface circuit, and a second logical RRU coupled to the single interface circuit, the first logical RRU and the second logical RRU both included as RRUs in the group of RRUs.

25. The system of claim 24, further comprising:
a second cluster of RRUs, each RRU of the second cluster of RRUs included in the group of RRUs and coupled to the fronthaul link; and
a second BBU, associated with the second cluster of RRUs and coupled to the fronthaul link;
wherein the first logical RRU is included in the cluster of RRUs and the second logical RRU is included in the second cluster of RRUs.

26. The system of claim 1, wherein the one or more parameters comprise synchronization states of the group of RRUs.

27. The system of claim 1, wherein the one or more parameters comprise a fronthaul link quality parameter.

28. The system of claim 1, wherein the one or more parameters comprise geographic locations of the group of RRUs or geographic locations of at least some of the mobile terminals of the plurality mobile terminals which are in active communication with the group of RRUs.

29. The system of claim 28, wherein the geographic locations of the group of RRUs include a building floor;
the electronic circuitry of the BBU to further assign the one or more RRUs to the cluster of RRUs based on the one or more RRUs having a common building floor location.

30. The system of claim 28, wherein the group of RRUs are mobile and the one or more parameters further comprise a geographic service area of the BBU;
the electronic circuitry of the BBU to further dynamically assign the one or more RRUs to the cluster of RRUs based on current locations of the group of RRUs and the geographic service area of the BBU.

31. The system of claim 30, further comprising one or more unmanned aircraft systems (UAS) coupled to a RRU of the cluster of RRUs.

32. The system of claim 31, the electronic circuitry of the BBU to further send commands to the UAS to dynamically position the cluster of RRUs based on the one or more parameters.

* * * * *